United States Patent Office 3,183,205
Patented May 11, 1965

3,183,205
ALKY PEROXIDE HEAT-CURED ORGANOPOLY-
SILOXANE ELASTOMERS
Donald L. Bailey, Snyder, William T. Black, Buffalo, and
Milton L. Dunham, Kenmore, N.Y., assignors to Union
Carbide Corporation, a corporation of New York
No Drawing. Filed Nov. 23, 1954, Ser. No. 470,834
5 Claims. (Cl. 260—37)

This invention relates to silicone elastomers and has for an object the provision of novel products and compositions useful in the production of such elastomers and novel products and compositions resulting from the curing of heat-curable silicone elastomers. The invention further contemplates the provision of novel methods and procedures useful in the production of heat-curable compositions and heat-cured compositions.

The invention is based, in part on our discovery that dialkyl peroxides possess the property or capacity for reacting selectively, or preferentially, and smoothly and efficiently to effect curing with predeterminable degrees of crosslinking among and between hydrocarbon-substituted linear polysiloxanes contained in heat-curable compositions largely, or substantially entirely, through the agency of unsaturated hydrocarbon groups present in the heat-curable compositions. We have found that the capacity of dialkyl peroxides so to function in the heat-curing of such heat-curable compositions permits the attainment of results, incapable of attainment heretofore, through the production and consistent reproduction of heat-cured silicone elastomers having combined or total or over-all qualities or properties superior to those of commercial heat-cured silicone elastomers produced heretofore and having specific or inidvidual qualities or properties superior to a large proportion, or substantially all, of the specific or individual qualities or properties of heat-cured silicone elastomers produced heretofore.

According to most, or virtually all, heretofore customary procedures for producing silicone elastomers (silicone rubber products) commercially, gum stocks consisting of hydrocarbon-substituted polysiloxanes are compounded with reinforcing fillers and curing agents on differential mixing rolls or in mixers, such as the Banbury mixer, of the types employed in compounding organic rubber stock. Milling and mixing operations disperse the fillers and curing agents uniformly throughout the gum stock undergoing compounding and the dispersion or distribution of the filler uniformly produces increases in the hardness, tensile strength, stiffness and resistance to cutting, tearing and abrasion.

Finely divided, solid silica has been employed most commonly as filler material, alone or in combination with other solid, finely divided mineral compounds. Commercial producers of silicone elastomers have endeavored to employ carbon black as a reinforcing filler because of the highly desirable qualities it imparts to organic rubber products. The success of such endeavors has been negligible heretofore in spite of published contentions and claims to the contrary.

The polysiloxanes employed in producing silicone elastomers in accordance with heretofore customary procedures, for the most part, are dimethyl polysiloxanes or hydrocarbon polysiloxanes comprising phenyl pendant groups as well as methyl pendant groups.

It has been proposed, heretofore, to employ hydrocarbon-substittued polysisloxanes in which the hydrocarbon substituents consist essentially of a large proportion of methyl groups and a relatively small proportion of vinyl groups. The production of such methyl vinyl polysiloxanes was controlled to incorporate trifunctional groups through cohydrolysis of dimethyl-dichlorosilane, methyl-vinyl-dichlorosilane and monomethyltrichlorosilane in order to provide for crosslinking between silicon atoms in adjacent polymers through oxygen atoms. Cured elastomers comprising such polymers have not been produced successfully commercially, possibly, because of interference of the oxygen-silicon crosslinking with crosslinking through the hydrocarbon groups and, probably, in addition, because of ineffectiveness of benzoyl peroxide, the recommended curing agent, in promoting desirable crosslinking uniformly and efficiently through the pendant hydrocarbon groups.

In the preparation of silicone elastomers in accordance with heretofore customary procedures, benzoyl peroxide and tertiary-butyl perbenzoate have been, and are, employed as curing agents. After compounding of the gum stock, filler and curing agent, the compound or composition is subjected to a mold cure treatment and, thereafter, to a postcure treatment in an air-circulating oven in order to eliminate volatile matter carried in with the filler and with the gum and to eliminate residues resulting from the cure reaction. Postcuring usually is carried out by heating mold cured products at a temperature of 480° F. for a period of twenty-four hours.

The following data illustrate the properties of two postcured elastomers prepared in accordance with Recipes "A" and "B" employed in forming elastomers in accordance with heretofore customary procedures, and one postcured elastomer prepared by utilizing the Recipe (or composition) "C" formulated in accordance with the invention and comprising (1) a hydrocarbon-substituted polysiloxane having saturated and unsaturated hydrocarbon substituent groups and (2) a dialkyl peroxide curing agent.

TABLE I

Recipe "A":
  100 parts by weight of dimethyl siloxane gum
  43 parts by weight of solid, finely divided silica filler
  2 parts by weight of benzoyl peroxide Recipe "B":
  100 parts by weight of dimethyl siloxane gum (identical with that employed in Recipe "A")
  43 parts by weight of solid, finely divided silica filler (identical with that employed in Recipe "A")
  2 parts by weight of tertiary-butyl perbenzoate Recipe "C":
  100 parts by weight of siloxane copolymer containing 0.15 mole percent of ethyl vinyl siloxane units and 99.85 mole percent (approximately) of dimethyl siloxane units
  43 parts by weight of solid, finely divided silica filler (identical with that employed in Recipe "A" and Recipe "B")
  0.4 part by weight of di-tertiary-butyl-peroxide After compounding of the components of the above recipes, the resulting heat-curable compositions were subjected to conventional mold curing treatments, and the mold-cured compositions were subjected to postcuring treatments in an air-circulating oven at a temperature of 480° F. for periods of twenty-four (24) hours with the production of postcured elastomer compounds (or compositions) having the following properties:

TABLE II

| Elastomer compound | Tensile strength (p.s.i.) | Elongation (percent) | Hardness (Shore A) |
|---|---|---|---|
| From Receipe "A" | 635 | 210 | 78 |
| From Receipe "B" | 531 | 210 | 77 |
| From Receipe "C" | 895 | 250 | 78 |

The above discussion of the conventional curing procedure and the data indicating results obtainable in practicing the invention, as compared with results obtainable in carrying out heretofore customary procedures, have been presented at this point in the belief that their consideration will simplify the matter of considering the substantial amount of data and the discussions of products and procedures to be presented hereinafter and, at the same time, will indicate, strikingly, the promise of the invention.

In practicing our invention to produce a silicone gum product that may be compounded with filler material and a curing agent for ultimate heat-curing, we employ one or more hydrocarbon-substituted siloxanes whose hydrocarbon substituents comprise saturated hydrocarbon groups of one or more types and unsaturated hydrocarbon groups of one or more types. In the production of heat-curable compounds (or compositions) of our invention, the hydrocarbon-substituted siloxanes may be employed entirely as linear polysiloxanes, or, they may be employed entirely as cyclic polysiloxanes, or, they may be employed partly as linear polysiloxanes and partly as cyclic polysiloxanes. When the unsaturated hydrocarbon substituents are present in a linear polysiloxane they preferably are present in limited predetermined numbers, and they are disposed at spaced intervals along the linear polysiloxane chains. Such linear polysiloxanes may be prepared by copolymerization methods or by blending methods. Thus, for example, they may be prepared (1) by hydrolysis methods involving cohydrolysis or predetermined proportions of one or more di-substituted dichlorosilanes whose hydrocarbon substituents consist of one or more types of saturated hydrocarbon groups or radicals and one or more di-substituted dichlorosilanes whose hydrocarbon substituents comprise one or more types of unsaturated hydrocarbon groups or radicals, or (2) by copolymerization of predetermined proportions of one or more low-molecular weight cyclic hydrocarbon-substituted polysiloxanes whose hydrocarbon substituents consist of one or more types of saturated hydrocarbon groups or radicals and one or more low-molecular weight cyclic, hydrocarbon-substituted polysiloxanes whose hydrocarbon substituents comprise one or more types of unsaturated hydrocarbon groups or radicals. Blending to achieve the effect of utilizing a linear hydrocarbon-substituted polysiloxane chain having both saturated and unsaturated hydrocarbon substituents may be carried out, for example, (A) By mechanically mixing (1) one or more cyclic, hydrocarbon-substituted polysiloxanes whose hydrocarbon substituents consist of one or more types of unsaturated hydrocarbon groups or radicals and each of whose molecules contains at least two unsaturated hydrocarbon groups or radicals and (2) one or more hydrocarbon-substituted linear polysiloxanes whose hydrocarbon substituents consist of one or more types of saturated hydrocarbon groups or radicals, or, (B) By mechanically mixing (1) one or more linear polysiloxanes whose hydrocarbon substituents consist of one or more types of saturated hydrocarbon groups or radicals and (2) one or more linear polysiloxanes whose hydrocarbon substituents comprise one or more types of unsaturated groups or radicals and each of whose molecules contains at least two unsaturated hydrocarbon groups or radicals, or, (C) By mechanically mixing (1) one or more linear polysiloxanes whose hydrocarbon substituents comprise one or more unsaturated hydrocarbon groups or radicals in relatively small proportion and (2) one or more linear polysiloxanes whose hydrocarbon substituents comprise one or more unsaturated groups or radicals in relatively large proportion.

The polysiloxanes to be blended may contain any amounts of saturated and unsaturated hydrocarbon substituent groups or radicals that will result in the production of a blend having the desired proportions of saturated and unsaturated hydrocarbon groups or radicals. The polysiloxanes employed in forming blended products may comprise or consist of relatively low-molecular weight polysiloxanes or of relatively high-molecular weight polysiloxanes or of both relatively low-molecular weight polysiloxanes and relatively high-molecular weight polysiloxanes. Mixing to effect blending may be carried out in any suitable manner. Thus, for example, mixing and blending may be carried out on or in rubber stock compounding rolls or mixers either prior to or during the mixing and compounding of the polysiloxane stock and the filler material. Mixing to effect blending may be carried out through the use of solutions or dispersions of one or more of the components to be mixed.

We prefer to employ hydrocarbon-substituted siloxanes whose one or more saturated hydrocarbon groups consist of types selected from the class consisting of methyl, ethyl and phenyl and whose one or more unsaturated hydrocarbon groups consist of types selected from the class consisting of vinyl, allyl and cyclohexenyl. The saturated hydrocarbon groups may be present as both of the hydrocarbon substituents of di-substituted siloxane units or as single hydrocarbon substituents of di-substituted siloxane units or as single hydrocarbon substituents of di-substituted siloxane units the other hydrocarbon substituents of which are unsaturated hydrocarbon groups.

In practicing the invention, we may employ siloxane gums comprising or consisting of relatively short-chain, low-molecular weight linear polysiloxanes of chain lengths falling within a limited range, which gums are pourable liquids, or, we may employ different siloxane gums of different higher viscosities each of which different gums comprises or consists of relatively longer-chain, relatively higher-molecular weight linear polysiloxanes, also having chain lengths falling within a limited range, up to the point at which the viscosity of the gum is such that it approaches the solid state and will barely flow when unconfined.

As curing agents, we prefer to employ dialkyl peroxide compounds having compositions corresponding to the following structural formulas:

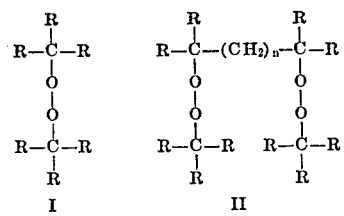

wherein R represents the same alkyl group throughout or alkyl groups of two or more different types and $n$ is zero (0) or a larger integer.

Among the specific curing agents that we prefer to employ are included

Di-tertiary-butyl peroxide;
Tertiary-butyl-triethylmethyl peroxide; and
Tertiary-butyl-tertiary-triptyl peroxide, the composition of which is represented by the structural formula

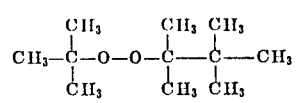

In producing silicone elastomers (silicone rubber) in accordance with our invention, we may employ any of the filler materials consisting of inorganic compounds or any suitable combination of such filler materials employed in the production of elastomers in accordance with heretofore customary procedures.

We may employ, also, carbon black fillers.

Following are two lists of suitable fillers consisting of inorganic compounds, one setting forth filler names and properties and the other setting forth the filler names, and chemical compositions.

FILLER PROPERTIES

| Filler | Particle diameter (millimicrons) | Surface area, sq. m. per gram | Approximate pH | sp. Gr. |
|---|---|---|---|---|
| Santocel CS | 30 | 100-150 | 3.5-4.5 | 2.2 |
| Hi-Sil X303 | 20-25 | 140-160 | 7.0-8.0 | 1.95 |
| Degussa Aerosil | 15.20 | 175-200 | 4.5-6.0 | 2.0 |
| Du Pont Very Fine Silica | 10 | 275-300 | 7.5-9.5 | 1.98 |
| Celite 270 | 1,000-6,000 | | 7.0 | 2.15 |
| Celite Superfloss | 2,000-4,000 | 20 | 8.5 | 2.3 |
| Witcarb R | 30-50 | 32 | 11.3 | 2.65 |
| FeO RY-2196 | <1,000 | | | 4.05 |
| Titanox RA | 300-400 | | 7.0 | 4.2 |
| Alon C | 20-40 | 50-120 | 4.5-7.0 | 3.6 |
| TAM Superpax | <5,000 | | | 4.5 |

DESCRIPTION OF VARIOUS MATERIALS USED FOR ELASTOMER FILLERS

| Trade name | Chemical composition |
|---|---|
| Santocel "CS" | Finely divided silica. |
| Aerosil or Cabosil | Finely divided, very pure silica. |
| Hi-Sil X-303 | Finely divided silica. |
| Dicalite PS | Diatomaceous silica. |
| Superfloss | Diatomaceous silica |
| Celite 270 | Diatomaceous silica. |
| Iceberg | Aluminum silicate. |
| Witcarb R | Calcium carbonate. |
| Zinc Oxide | Zinc oxide. |
| Superpax | Zirconium silicate. |
| Titanox RA | Titania. |
| Lithopone | Barium sulfate-zinc sulfide. |
| FeO RY-2196 | Iron oxide. |
| Alon C | Aluminum oxide. |
| Du Pont Very Fine Silica | Finely divided silica. |

We may employ any suitable carbon black as filler in preparing silicone elastomers in accordance with the invention. Furnace blacks can be employed satisfactorily, particularly high-abrasion furnace blacks, in elastomer production procedures involving compounding silicone gum with carbon black and a dialkyl peroxide curing agent, subjecting the compound or composition to a mold cure and, thereafter, subjecting the cured product to postcure heat-aging treatment.

We have found that the capacity of an available carbon black product to function effectively as a filler is influenced by particle size, hydrogen ion concentration and content of volatile matter. Carbon black products consisting of particles larger than about 850 A. may provide low reinforcement. Generally, carbon black products consisting of particles larger than 850 A. or smaller than 300 A. and having volatile matter contents higher than about 2.0 percent by weight and hydrogen ion concentrations lower than that corresponding to a pH of about 9.0 (as indicated by results obtained in measuring hydrogen ion concentrations of water dispersions of carbon blacks in accordance with the standard procedure employed by the carbon black manufacturers) can not be employed advantageously without having been subjected to preliminary or precure corrective treatments, such, for example, as precure heat-aging treatments, or in compounding treatments in recipes that include an alkaline agent or acid acceptor. Channel blacks, being acid in reaction and having relatively high contents of volatile matter require suitable preliminary or precure treatments to condition them for effective use.

In the use of carbon black fillers in practicing our invention, we prefer to employ furnace blacks comprising particles in the range, 300 A. to 850 A., containing volatile matter in amounts not greater than about 2.0 percent by weight and having hydrogen ion concentrations corresponding to a pH not lower than about 9.0. We may employ channel black products in procedures involving precure corrective treatments, such for example, as precure heat treatments, and in procedures involving incorporation in recipes for compounding of alkaline agents or acid acceptors such as calcium carbonate.

Preparation of hydrocarbon-substituted linear polysiloxanes of the invention containing saturated and unsaturated hydrocarbon substituents may be carried out by means of any of the procedures whose fundamental features are known to those skilled in the art. In practicing our invention for the production of such linear polysiloxanes, in one of its aspects, we follow a procedure involving (1) hydrolysis, on the one hand, of one or more hydrocarbon-substituted dichlorosilanes in which the substituents consist of saturated hydrocarbon groups to produce a crude hydrolyzate containing linear polysiloxanes whose hydrocarbon substituents consist of saturated hydrocarbon groups of one or more types, and, on the other hand, of one or more hydrocarbon-substituted dichlorosilanes whose hydrocarbon substituents comprise one or more unsaturated hydrocarbon groups to produce a crude hydrolyzate containing linear polysiloxanes whose hydrocarbon substituents comprise unsaturated hydrocarbon groups of one or more types, (2) depolymerization of the crude hydrolyzates to form separate mixtures of low-boiling point, low-molecular weight, cyclic polymers (in one case having only saturated hydrocarbon pendant groups and in the other case having some unsaturated hydrocarbon pendant groups) and undesirable material resulting from the virtually unavoidable presence of monofunctional and trifunctional silanes in association with the difunctional dichlorosilane products treated initially and (3) fractional distillation of the two products of depolymerization to vaporize and collect two pure products containing the low-boiling point, low-molecular weight cyclic polymers free of any significant amounts of monofunctional and trifunctional groups of molecules. We utilize the two pure, or relatively pure, products obtained in the distillation treatments, one comprising cyclic polymers whose pendant groups consist essentially of one or more saturated hydrocarbons and the other comprising cyclic polymers whose pendant groups consist essentially of one or more saturated hydrocarbons and the other comprising cyclic polymers whose pendant groups comprise one or more unsaturated hydrocarbons, to produce a linear polysiloxane copolymer by mixing them in proportions such as to provide in the resulting linear polysiloxane product a predetermined number of unsaturated groups with respect to the total number of hydrocarbon groups present therein, and we subject the mixture to an appropriate polymerization treatment under controlled conditions to produce linear polysiloxanes of desired molecular weights and viscosities and having both saturated and unsaturated pendant groups attached to silicon atoms along the linear polysiloxane chains.

Thus, for example, in the production of a copolymer comprising a linear polysiloxane having both saturated and unsaturated hydrocarbon groups attached to silicon atoms along the linear chain, a copolymer having methyl and ethyl (saturated groups) and vinyl (unsaturated groups) may be produced by subjecting to hydrolysis a product comprising dimethyldichlorosilane (which product will, normally, be contaminated with about 0.3 percent to 0.7 percent by weight of monomethyltrichlorosilane) to produce a crude hydrolyzate containing polymerized dimethyl linear polysiloxanes and undesirable materials resulting from the presence in the dimethyldichlorosilane product of monomethyltrichlorosilane. The crude hydrolyzate, subsequently, is subjected to a depolymerization treatment by mixing it with potassium hydroxide (KOH) and diphenyl solvent in the proportions, by weight, 39 parts of the crude hydrolyzate, 1.0 part of potassium hydroxide and 60 parts of diphenyl solvent, and heating the mixture at a temperature in the range, 150° C. to 175° C., under an absolute pressure of 100 mm. Hg to produce and remove by vaporization a product consisting of low-molecular weight cyclic polysiloxanes, comprising, for example, about eighty-five percent (85%) of the tetramer $[(CH_3)_2SiO]_4$ and fifteen percent (15%) of mixed trimer $[(CH_3)_2SiO]_3$ and pentamer $[(CH_3)_2SiO]_5$.

Materials resulting from the presence of monomethyltrichlorosilane (MeSiCl$_3$) in the initial product containing dimethyldichlorosilane remain as a residue in the distillation vessel or tower.

The distillate consisting essentially of low-molecular weight cyclic dimethyl polymers, free of any significant amount of monofunctional and trifunctional groups or molecules, is prepared for a controlled polymerization treatment in a polymerization mixture formed by mixing the distillate with (1) one or more cyclic ethyl vinyl polysiloxanes such, for example, as the trimer

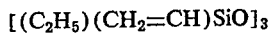

or the tetramer [C$_2$H$_5$)(CH$_2$=CH)SiO]$_4$ or both, (2) potassium silanolate,

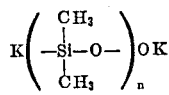

in amount sufficient to provide thirty (30) parts by weight of potassium ion (K$^+$) per million parts by weight of the distillate, and (3) an amount of one or more monofunctional compounds calculated to function as end-blockers for limiting the degree of polymerization and, consequently, the lengths and molecular weights of the linear polysiloxane chains and for stabilizing the polymers. After thorough stirring in order to effect thorough dispersion of the components and the production of a substantially homogeneous product, the mixture is heated in a sealed vessel at a temperature of about 150° C. for a period of time varying from about one hour to two and one-half hours. The degree of completion of the polymerization reactions is determined through viscosity measurements or miniature penetrometer readings. The elimination of residual trifunctional compounds, also, is promoted by the use of monofunctional compounds in accordance with our invention.

Monofunctional compounds that may be employed satisfactorily for controlling polymer growth include, among others, Hexamethyl disiloxane, (CH$_3$)$_3$SiOSi(CH$_3$)$_3$;
Tetramethyldiethoxy disiloxane,
    (CH$_3$)$_2$(C$_2$H$_5$O)SiOSi(OC$_2$H$_5$)(CH$_3$)$_2$;
Monoethyltriethoxy silane, C$_2$H$_5$Si(OC$_2$H$_5$)$_3$;
Diethyltetraethoxy disiloxane,
    C$_2$H$_5$(C$_2$H$_5$O)$_2$SiOSi(OC$_2$H$_5$)$_2$C$_2$H$_5$;
Tetramethyldimethoxyethoxy disiloxane,
    (CH$_3$)$_2$CH$_3$OC$_2$H$_4$OSiOSiOC$_2$H$_4$OCH$_3$(CH$_3$)$_2$; and
Divinyltetraethoxy disiloxane,
    CH$_2$=CH(C$_2$H$_5$O)$_2$SiOSi(OC$_2$H$_5$)$_2$CH=CH$_2$ Copolymers whose pendant groups consist largely of methyl groups and include additional saturated hydrocarbon groups other than, or in addition to, ethyl groups and unsaturated hydrocarbon groups other than, or in addition to, vinyl groups may be employed by means of procedure similar to that described above or by means of procedures modified in accordance with the known characteristics of the various hydrocarbon groups sought to be included.

Processes employed in producing copolymer gums of our invention for use in producing compounds and elastomers of our invention preferably are so controlled as to produce gums having R (saturated) R' (unsaturated) siloxane units disposed along the linear polysiloxane chains in amounts in the range, 0.037 to 0.74 mole percent (equivalent to about 0.05 to 1.0 weight percent), of the total number of moles contained in the linear polysiloxane chains. Stated otherwise, from about 0.037 to about 0.74 percent of the total silicon atoms in the copolymer gums of this invention are bonded to unsaturated hydrocarbon groups. The introduction into the polysiloxane chains of the numbers of unsaturated hydrocarbon groups indicated contemplates the provision of sufficient numbers of such groups to provide for the development, upon curing, of about five (5) to twenty (20) crosslinks per molecule through the unsaturated groups. It is to be understood that we may provide unsaturated hydrocarbon groups in greater or lesser numbers to provide for establishing crosslinks through such groups in greater or lesser numbers in practicing our invention.

Blending processes and operations carried out in accordance with our invention are based, generally, on the same considerations with respect to unsaturated hydrocarbon groups as are processes and operations involving the production and use of copolymers containing unsaturated hydrocarbon groups.

In producing hydrocarbon-substituted polysiloxane gums in which the hydrocarbon substituents consist of saturated hydrocarbon groups, for use in the blending processes of our invention, we may employ the procedure described above for producing copolymers modified only by the exclusion of cyclic polysiloxanes containing unsaturated hydrocarbon groups from the mixture.

The hydrocarbon-substituted linear polysiloxane polymers and copolymers we employ, or produce, or produce and employ in carrying out our invention preferably are produced under conditions so controlled as to avoid (1) the incorporation therein of any significant amounts of trifunctional compounds, groups or molecules, thus to avoid crosslinking of polysiloxane linear chains through silicon and oxygen atoms in subsequent curing operations, and (2) the incorporation therein of any significant amounts of monofunctional compounds, groups or molecules other than those specifically provided to serve as end-blockers for limiting the degree of polymerization and for stabilization purposes. Accordingly, such linear polysiloxane polymers and copolymers contain hydrocarbon pendant groups and silicon atoms in the ratio of 2.0 hydrocarbon groups per silicon atom (approximately). Deviation from a ratio of 2.0 in any instance with respect to the preferred practices, procedures, gums and compounds of our invention will be insignificant for all practical purposes since it will be attributable to the presence of end-blocking hydrocarbon groups whose total numbers will be insignificant as compared with the total numbers of hydrocarbon groups attached to silicon atoms of the linear polysiloxane chains between the single hydrocarbon groups serving as blockers for each end of each of the polysiloxane chains.

We prefer to employ polysiloxane polymers and copolymers containing hydrocarbon pendant groups in a ratio of two (2.0) per silicon atom in order to provide for optimum effectiveness of crosslinking in heat-curing through the agency of unsaturated hydrocarbon groups alone. It is to be understood, however, that, because of the effectiveness of the dialkyl peroxide curing agents we employ, results superior to those attainable theretofore can be attained in practicing our invention even when the ratio of hydrocarbon groups to silicon atoms is slightly less than 2.0 because of the presence of minor amounts of trifunctional groups which permit a limited amount of crosslinking through silicon and oxygen atoms in heat-curing treatments.

For curing purposes, we may employ the curing agents of the invention in any suitable amounts and proportions with respect to the amounts and proportions of unsaturated groups present in copolymers and in blended products, but we prefer to employ the curing agents in stoichiometric or chemically equivalent amounts with respect to the unsaturated hydrocarbon groups plus, when necessary, amounts in excess of the stoichiometric amounts sufficient to compensate for volatilization of the curing agents that might take place during heat-curing operations.

In producing elastomers in accordance with our invention, we prefer to subject compounds (or compositions) that have been milled or otherwise mixed to disperse fillers and curing agents in the polysiloxane copolymer gums and blended gums to mold-curing (or heat-curing) treatments at temperatures above 300° F. (preferably 340° F. or higher) for periods of time longer than fifteen minutes (preferably twenty-five minutes or longer), and thereafter, to subject the mold-cured (or heat-cured) products to heat-aging treatments at higher temperatures in air-circulating ovens for periods of time sufficiently long to permit effective elimination through vaporization of objectionable inclusions such as water, residues from curing agent reactions and low-molecular weight gum stock fractions. Heating of the cured products to a temperature of about 480° F. through or during a period of about twenty-four hours usually is effective for eliminating such undesirable inclusions.

In some instances, we find it to be advisable, in order to provide for obtaining optimum results, to subject a compound, after incorporation of the filler in the gum but before inclusion of the curing agent, to room temperature aging for a period of about one day to one week, or, to precure heat-aging at an elevated temperature above about 250° F. and up to 300° F. or higher for a period of time ranging from one to two or more hours. Both types of precure aging provide opportunities for better wetting of fillers by the gums, and the precure heat-aging provides the additional advantage of effecting elimination of objectionable volatile matters such as water and adsorbed gases carried into compounds by fillers.

At the conclusion of a precure aging treatment, the compound is re-plasticized, as by milling, the curing agent is incorporated to produce a heat-curable compound and, thereafter, the heat-curable compound is heat-cured, and the heat-cured product is subjected to a post-cure heat-aging treatment. As hereinbefore pointed out, precure heat-aging of a compound comprising a carbon black filler, not amenable to use as a filler for a compound to be subjected to immediate heat-curing, permits its use effectively when the compound is re-plasticized, inoculated with a curing agent and, thereafter, subjected, successively to heat-curing and heat-aging treatments.

Precure heat-aging treatments are not essential, but may be employed, when a compound comprising any suitable filler is to be formed in thick-section moldings. Precure heat-aging permits the elimination of volatile matters at a stage wherein distortion resulting from gas elimination is not harmful and reduces the amount of gas that must be eliminated in the postcure heat aging with consequent reduction the amount that must be eliminated at the critical time when density and structural form must be retained.

The following examples describe processes of the invention involving the production and use of linear polysiloxane gums of different compositions and consistencies in accordance with the invention:

*Example 1.*—A relatively hard gum comprising linear polysiloxanes consisting of dimethyl siloxane units (99.926 mole percent) and ethyl vinyl siloxane units (0.074 mole percent) was prepared by heating 3065 grams of octamethylcyclotetrasiloxane tetramer $[(CH_3)_2SiO]_4$ to a temperature of 145° C. and, thereafter, adding ethyl vinyl trimer $[(C_2H_5)(CH_2=CH)SiO]_3$ in amount equal to one-tenth of one percent (0.10%) of the weight of the resulting mixture and an amount of potassium silanolate, $K(OSiMe_2)_nOK$, containing four-tenths of one percent (0.4%) by weight of potassium ion ($K^+$) sufficient to provide 27.8 parts of potassium ion per million parts of the mixture of cyclic siloxanes. The resulting mixture was stirred for ten minutes to effect thorough intermixing of the components, and, thereafter, it was heated at a temperature of 150° C. for two and one-half hours in a sealed vessel. After the conclusion of the heating period, the vessel was cooled to room temperature and opened. The cooled vessel contained a linear polysiloxane gum having a hardness corresponding to a miniature penetrometer reading of 35 at room temperature, which was soluble in toluene and whose pendant hydrocarbon group to silicon atom ratio was 2.0 (approximately).

An elastomer was prepared by Banbury mixing 900 g. of the linear polysiloxane with 315 g. of Santocel CS (finely divided silica) filler and then milling and sheeting off a 6″ x 12″ roll mill. The resulting compound was then precure heat-aged for one hour at 150° C. in a circulating air oven. One hundred thirty-five grams of the precure heat-aged compound was replasticized with 0.4 gram of di-tertiary- butyl peroxide. The resulting compound was heat-cured in a mold at 340° F. for 25 minutes and postcure heat-aged at a temperature of 480° F. (250° C.) for 30 hours.

The mold-cured and postcure heat-aged products had the following physical properties:

|  | Mold-cured for 25 minutes at at 350° F. | Postcure head-aged for 30 hours at 480° F. (250° C.) |
|---|---|---|
| Tensile, p.s.i. | 1,136 | 785 |
| Elongation, percent | 720 | 575 |
| Set at break, percent | 3 | 3 |
| Hardness, Shore A. durometer | 26 | 30 |

*Example 2.*—An elastomer was prepared by milling 60 grams of a linear polysiloxane (of a composition substantially identical with that of Example 1) with 18 grams of Santocel CS (finely divided silica) filler and 0.7 gram of di-tertiary-butyl peroxide, heat-curing the resulting compound in a mold at 350° F. for thirty (30) minutes and postcure heat-aging the resulting heat-cured product (or elastomer) at a temperature of 480° F. (250° C.) for 24 hours.

The mold-cured and heat-aged products had the following physical properties:

|  | Mold-cured for 30 minutes at 350° F. | Postcure heat-aged for 24 hours at 480° F. (250° C.) |
|---|---|---|
| Tensile (p.s.i.) | 825 | 640 |
| Elongation (percent) | 950 | 625 |
| Set at break (percent) | 15 | 12 |
| Hardness (Shore A) durometer | 38 | 55 |

*Example 3.*—The following data relating to physical properties were obtained in curing compounds of the compositions and under the conditions indicated, employing tertiary-butyl peracetate as curing agent.

RECIPES (IN PARTS BY WEIGHT)

| | | | |
|---|---|---|---|
| Gum stock consisting essentially of dimethyl polysiloxane units (99.65 mole percent) and ethyl vinyl siloxane units (0.35 mole percent) | 100 | | |
| Gum stock consisting essentially of dimethyl siloxane units | | 100 | 100 |
| Santocel CS (finely divided silica) | 35 | 35 | 35 |
| Tertiary-butyl peracetate | 0.9 | 0.9 | 0.9 |

PHYSICAL PROPERTIES OF ELASTOMERS

| | | | |
|---|---|---|---|
| Immediate cure conditions: | | | |
| Time in minutes | 25 | 15 | 25 |
| Temperature in degrees F | 340 | 248 | 340 |

PROPERTIES OF PRODUCT OF IMMEDIATE CURE

| | | | |
|---|---|---|---|
| Tensile (p.s.i.) | 690 | (1) | (2) |
| Elongation (percent) | 380 | (1) | (2) |
| Hardness (Shore A) | 51 | (1) | (2) |
| Set at break (percent) | Nil | (1) | (2) |

PROPERTIES OF PRODUCTS POSTCURE HEAT-AGED AT 480° F. FOR 24 HOURS

| | | | |
|---|---|---|---|
| Tensile (p.s.i.) | 800 | (1) | (2) |
| Elongation (percent) | 250 | (1) | (2) |
| Hardness (Shore A) | 65 | (1) | (2) |
| Set at break (percent) | Nil | (1) | (2) |
| Linear shrinkage (percent) | 5.8 | (1) | (2) |
| Weight loss (percent) | 5.8 | (1) | (2) |

1 No cure.
2 Partial cure.

*Example 4.*—A relatively soft ethoxy end-blocked gum comprising linear polysiloxanes consisting of dimethyl siloxane units (99.74 mole percent) and ethyl vinyl siloxane units (0.26 mole percent) was prepared by mixing 29,800 grams of octamethylcyclotetrasiloxane $[(CH_3)_2SiO]_4$ with 4 grams of tetramethyldiethoxydisiloxane and 300 grams of a polysiloxane copolymer consisting of ethyl vinyl siloxane units (28 percent by weight) and dimethylsiloxane units (72 percent by weight), stirring to mix the components thoroughly, heating the mixture to a temperature of 145° C., adding as a catalyst a solution of potassium silanolate in amount sufficient to provide 30 parts of potassium ion per million parts of the mixture, again stirring for ten minutes, and, then, heating the resulting mixture in a sealed vessel to a temperature of 150° C. for an hour and forty-five minutes. After the conclusion of the heating period, the vessel was permitted to stand overnight to permit cooling of its contents to room temperature.

The linear polysiloxane gum contained in the cooled vessel had a hardness corresponding to a miniature penetrometer reading of 78 at room temperature, was soluble in toluene and had a pendant hydrocarbon group to silicon atom ratio of 2.0 (approximately).

The gum was compounded in accordance with the following recipes (all parts refer to parts by weight):

| Recipe and compound number | Parts of gum | Parts of Santocel CS | Parts of Superfloss | Parts of benzoyl peroxide | Parts of di-tertiary-butyl peroxide |
|---|---|---|---|---|---|
| 5A | 100 | 35 | | | 0.8 |
| 5B | 100 | 40 | | | 0.8 |
| 5C | 100 | 45 | | | 0.8 |
| 5D | 100 | 40 | 5 | | 0.8 |
| 5E | 100 | 40 | 15 | | 0.8 |
| 5F | 100 | 35 | | 0.4 | |
| 5G | 100 | 40 | | 0.4 | |
| 5H | 100 | 45 | | 0.4 | |
| 5J | 100 | 40 | 5 | 0.4 | |
| 5K | 100 | 40 | 15 | 0.4 | |

*Compounding procedure for the above recipes*

(1). RECIPES SPECIFYING ONLY SANTOCEL CS FILLER

Three batches each containing 300 grams of gum were compounded for each recipe, five different recipes on the basis of fillers. In compounding each batch, the gum (300 grams) was sheeted on a 6 inch x 12 inch two-roll mill with rolls at room temperature. Filler addition was begun immediately after sheeting of the gum on the mill was completed. The filler was added in portions of about 20 grams each (more or less).

The time consumed in adding and completely dispersing the filler was not allowed to exceed fifteen minutes. At the end of the fifteen minute period, the compound was sheeted from the mill. After all three batches containing the gum and filler for each recipe had been compounded, all were placed on the mill again and homogenized for fifteen minutes to form a single batch for each recipe. Each homogenized batch was sheeted from the mill, rolled into a tight roll, and all were stored for 48 hours at room temperature. At the conclusion of the storage period, each batch was split into two parts. One part was placed on a cold 6 inch x 12 inch two roll mill and "re-plasticized." This process required about 20 minutes. The compound was sheeted from the mill and weighed. The quantity of di-tertiary-butyl peroxide required for curing was estimated to be 0.8 part on the basis of 100 parts gum content. The same re-plasticization procedure was followed with the other part of each batch. The benzoyl peroxide requirement for curing was estimated to be 0.4 part per 100 parts of gum. Di-tertiary-butyl peroxide was dispersed in half of the batches and benzoyl peroxide was dispersed in the other half of the batches by milling. The compounds having the curing agents dispersed therein were sheeted from the mill which was set to produce sheets about one-tenth of an inch (0.1") thick. Slabs weighing 63 grams and about five inches square were cut from the sheets and cured in a 6 inch x 6 inch mold. Compounds containing benzoyl peroxide as curing agent were cured for 15 minutes at 250° F. Slabs containing di-tertiary-butyl peroxide were cured for 20 minutes at 340° F.

(2) RECIPES SPECIFYING SANTOCEL CS AND SUPERFLOSS

The procedure described above for "Recipes Specifying Only Santocel CS Filler" were followed exactly except that the time allowed for filler addition was 20 minutes instead of 15 minutes.

Two compression set plugs (½ inch thick and 1.129 inches in diameter) were cured from each of the compounds cured with di-tertiary-butyl peroxide.

Similar, but laminated, compression set plugs were prepared from elastomers cured with benzoyl peroxide.

The cure cycle for the compounds cured with ditertiary-butyl peroxide was 1 hour at 340° F. They were postcure heat-aged at 480° F. for 24 hours.

The cure cycle for the compounds cured with benzoyl peroxide was 15 minutes at 250° F. They were postcure heat-aged at 480° F. for 24 hours.

Portions of two compounds having di-tertiary-butyl peroxide incorporated therein and two compounds having benzoyl peroxide incorporated therein were subjected to thick-section curing in a 1 inch x 3 inch diameter mold.

The cure cycle for the thick section-cure with ditertiary-butyl peroxide was 2 hours at 340° F. Postcure heat-aging was carried out for 24 hours at 480° F.

The cure cycle for the thick-section cure with benzoyl peroxide was 2 hours at 250° F. Postcure heat-aging was carried out for 24 hours at 480° F.

The data obtained in testing the various elastomers produced in curing the compounds are listed immediately below. In order to facilitate comparison of results obtained in curing the five different pairs of compounds where the two members of each pair are identical except that in one ditertiary-butyl peroxide was employed as curing agent and in the other benzoyl peroxide was employed as curing agent, the pairs are set forth as such with the properties of elastomers obtained by curing with di-tertiary-butyl peroxide being set forth above the properties of elastomers obtained by curing with benzoyl peroxide. The compositions of the compounds employed are listed near the commencement of this example under the identification symbols set forth below.

ELASTOMER PHYSICAL PROPERTIES

| Mold cure | 5A | 5B | 5C | 5D | 5E | Curing agent |
|---|---|---|---|---|---|---|
| | 5F | 5G | 5H | 5J | 5K | |
| Tensile (p.s.i.) | 916 | 1,000 | 1,000 | 922 | 936 | DTBP [1] |
| | 922 | 890 | 1,059 | 936 | 1,000 | $Bz_2O_2$ |
| Elongation (percent) | 355 | 335 | 310 | 330 | 270 | DTBP |
| | 370 | 345 | 345 | 377 | 370 | $Bz_2O_2$ |
| Hardness (Shore A) | 40 | 45 | 47 | 55 | 72 | DTBP |
| | 39 | 44 | 46 | 52 | 70 | $Bz_2O_2$ |
| Set at Break (percent) | Nil | Nil | Nil | Nil | Nil | DTBP |
| | Nil | Nil | Nil | Nil | Nil | $Bz_2O_2$ |
| POSTCURE | | | | | | |
| Tensile (p.s.i.) | 723 | 856 | 720 | 946 | 799 | DTBP |
| | 889 | 754 | 864 | 945 | 781 | $Bz_2O_2$ |
| Elongation (percent) | 250 | 230 | 230 | 220 | 160 | DTBP |
| | 290 | 240 | 230 | 250 | 200 | $Bz_2O_2$ |
| Hardness (Shore A) | 53 | 57 | 60 | 71 | 85 | DTBP |
| | 50 | 55 | 60 | 68 | 81 | $Bz_2O_2$ |
| Set at break | Nil | Nil | Nil | Nil | Nil | DTBP |
| | Nil | Nil | Nil | Nil | Nil | $Bz_2O_2$ |
| Weight loss (percent) | 7.1 | 6.9 | 6.6 | 5.0 | 6.6 | DTBP |
| | 7.9 | 7.8 | 7.3 | 7.4 | 7.2 | $Bz_2O_2$ |
| Total shrinkage (percent) | 7.3 | 6.2 | 7.3 | 7.3 | 8.3 | DTBP |
| | 6.2 | 6.2 | 5.7 | 6.2 | 7.3 | $Bz_2O_2$ |
| Tear (Die C) (pounds per inch) | 39 | 35 | 39 | 45 | 53 | DTBP |
| | 38 | 35 | 32 | 47 | 53 | $Bz_2O_2$ |
| 100% modulus (p.s.i.) | 186 | 236 | 244 | 364 | 484 | DTBP |
| | 172 | 213 | 258 | 289 | 394 | $Bz_2O_2$ |
| Compression set (22 hours at 350° F., Method B) (percent) | 12.7 | 13.2 | 14.0 | 12.2 | [2] 19.9 | DTBP |
| | 18.3 | 18.7 | -------- | 22.7 | 28.1 | $Bz_2O_2$ |
| Compression set (96 hours at 350° F., Method B) (percent) | 25.5 | 28.8 | 27.7 | 23.1 | 31.5 | DTBP |
| | 31.4 | 32.5 | -------- | 31.9 | 35.7 | $Bz_2O_2$ |
| THICK-SECTION CURES | | | | | | |
| (Unaged) (hardness, surface) | -------- | 39–42 | -------- | -------- | 70–2 | DTBP |
| | -------- | 44–6 | -------- | -------- | 69–71 | $Bz_2O_2$ |
| (Hardness, center) | -------- | 40–2 | -------- | -------- | 70–2 | DTBP |
| | -------- | 44–6 | -------- | -------- | 69–71 | $Bz_2O_2$ |
| (Aged) 24 hours at 480° F | -------- | 48 | -------- | -------- | 75 | DTBP |
| | -------- | 45–6 | -------- | -------- | 73 | $Bz_2O_2$ |
| (Hardness center) | -------- | 48 | -------- | -------- | 65–7 | DTBP |
| | -------- | 30 | -------- | -------- | 68 | $Bz_2O_2$ |

[1] DTBP=di-tertiary-butyl peroxide. $Bz_2O_2$=benzoyl peroxide.
[2] High compression sets probably can be attributed to filler loadings.

Remarks, visual observations:
5B, 5E—No discoloration, delamination or cracks.
5G—Much sponging, cracking.
5K—Delamination, no discoloration.
No thick-section cures were carried out for 5A, 5C, 5D, 5F, 5H and 5J.

*Example 5.*—For the purpose of demonstrating the capacity of linear polysiloxane gums of the invention to function to produce elastomers having very low compression set, 100 parts of a linear polysiloxane copolymer consisting essentially of dimethyl siloxane units (99.75% by weight) and ethyl vinyl siloxane units (0.25% by weight=0.185 mole percent) was milled with 45 parts of Santocel CS and 1.0 part of ditertiary-butyl peroxide (all parts by weight) and the resulting compound was cured by heating to 340° F. for thirty (30) minutes, and the cured product was subjected to a postcure heat-aging treatment for 24 hours at 480° F. (250° C.)

The compression set of the postcure heat-aged elastomer was shown to be 9.7 in tests conducted in accordance with ASTM D–395–52T Method B for 22 hours at 350° F.

*Example 6.*—For the purpose of demonstrating the capacity of linear polysiloxanes of the invention to function to produce elastomers that can be employed successfully to make sound thick-section moldings, a polysiloxane copolymer gum consisting essentially of dimethyl siloxane units (99.8 percent by weight) and ethyl vinyl siloxane units (0.20 percent by weight=0.148 mole percent) was milled with Santocel CS to disperse the Santocel CS uniformly in the polysiloxane gum. The resulting compound was precure heat-aged for 2 hours at 300° F.

and, thereafter, remilled with di-tertiary-butyl peroxide. The components were employed in the proportions by weight, 100 parts of gum, 43 parts of Santocel CS and 0.7 part of di-tertiary-butyl peroxide. The resulting compound was heat-cured at a temperature of 340° F. for thirty minutes. The cured gum showed tensile of 890 p.s.i., elongation of 220%, and Shore A Durometer hardness of 65. Compression set, ASTM D–395–52T, Method B, was 15% (22 hours at 350° F.).

Uncured compound of the above description was molded into a 3 inch diameter x 1 inch high cylinder and cured at 340° F. for one and one-half (1½) hours and subjected to a postcure at 480° F. for 24 hours. The molding was solid, with no blowing or other defects, and its Shore A Durometer hardness values ranged from 47 to 50 over a cross section.

After heat-aging for 18 hours at 480° F. (250° C.), the disc was cut in half vertically with respect to its plane faces. There was a slight discoloration in the center, but hardness still was 47 to 50, and there was no evidence of blowing or degradation.

*Example 7.*—For the purpose of demonstrating the capacity of linear polysiloxane copolymers of the invention to function to provide elastomers having carbon black fillers, the polysiloxane copolymer gum employed in Example 1 was milled with carbon black (Philblack A, MAF grade) and di-tertiary-butyl peroxide curing agent to effect uniform dispersion of the carbon black and the curing agent in the gum. The components were employed in the proportions by weight, 100 parts of gum, 60 parts of carbon black and 2.8 parts of curing agent. The milled product yielded a definitely cured elastomer when heat-cured in a mold at 350° F. for thirty (30) minutes.

*Example 8.*—The linear polysiloxane copolymer gum employed in Example 4 was milled with carbon black (Philblack A, MAF grade) and di-tertiary-butyl peroxide curing agent to effect uniform dispersion of the carbon black and the curing agent in the gum. The components were employed in the proportions by weight, 100 parts of gum, 47 parts of carbon black and 0.8 part of curing agent. The product of the milling treatment, when heat-cured in a mold at a temperature of 340° F. for twenty-five (25) minutes, yielded a mold cured, carbon black filled elastomer having the following physical properties:

Hardness (Shore A) _____ 45
Tensile strength (p.s.i.) _____ 737
Elongation (percent) _____ 300

*Example 9.*—In another demonstration of the capacity of polysiloxane copolymers of the invention to function to provide carbon black-filled elastomers, a linear polysiloxane copolymer gum consisting essentially of dimethyl siloxane units (99.5 percent by weight) and ethyl vinyl siloxane units (0.5 percent by weight=0.37 mole percent) was milled with carbon black (Philblack A, MAF grade) and di-tertiary-butyl peroxide curing agent to effect uniform dispersion of the carbon black and curing agent in the gum. The components were employed in the proportions by weight, 100 parts of gum, 60 parts of carbon black and 2.8 parts of curing agent. The product of the milling treatment, when heat-cured in a mold for 30 minutes at 350° F. and subsequently subjected to a postcure heat-aging treatment for 24 hours at 480° F. (250° C.), yielded carbon-filled elastomers having the following physical properties:

|  | Mold cured elastomer | Postcure heat-aged elastomer |
|---|---|---|
| Tensile strength (p.s.i.) | 720 | 650 |
| Elongation (percent) | 200 | 140 |
| Set at break (percent) | 2 | 0 |
| Hardness (Shore A) | 57 | 74 |

As shown by the data set forth herein, polysiloxane products containing ethyl vinyl siloxane units may be heat-cured advantageously with organic peroxides generally to produce superior silicone elastomers, and our invention is based, in part, on that discovery. The organic peroxides that we have found to be effective in curing polysiloxanes containing ethyl vinyl siloxane units, in addition to dialkyl peroxides, are aliphatic peroxy esters, represented by tertiary-butyl peracetate; aromatic peroxy esters, represented by tertiary-butyl perbenzoate; and diacyl peroxides, represented by di-benzoyl peroxide and bis dichlorobenzoyl peroxide. As in the case of di-tertiary-butyl peroxide, tertiary-butyl peracetate is highly effective in curing polysiloxanes containing dimethyl siloxane units and ethyl vinyl siloxane units and relatively ineffective in curing polysiloxanes consisting of dimethyl siloxane units, whereas, tertiary-butyl perbenzoate effectively cures both polysiloxanes containing dimethyl siloxane units and ethyl vinyl siloxane units and polysiloxanes consisting of dimethyl siloxane units. The relative capacities of curing agents to effect curing of polysiloxanes consisting of dimethyl siloxane units and polysiloxanes comprising pendant vinyl groups are illustrated roughly by the diagram shown below.

HYDROCARBON GROUP SUSCEPTIBILITY

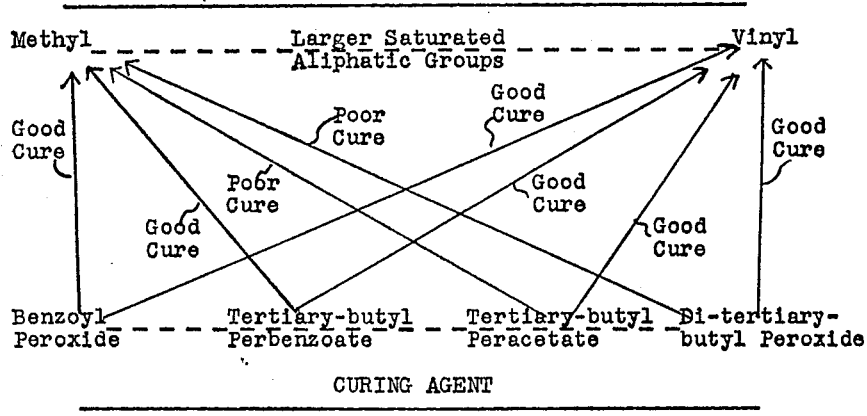

CURING AGENT

REACTIVITY

The above diagram shows the methyl group to be the least susceptible to curing of the saturated aliphatic groups and the vinyl group to be more susceptible to curing than the saturated aliphatic groups. Benzoyl peroxide is shown as the most highly reactive and di-tertiary-butyl peroxide is shown as the last reactive of those curing agents set forth in the diagram.

In practicing our invention, we prefer to employ peroxide curing agents that react effectively at mold-cure temperatures but whose vapor pressures at those temperatures are substantially lower than 760 mm. Hg. We can employ advantageously, however, such curing agents whose boiling temperatures at 760 mm. Hg are between 100° C. and 150° C. and such curing agents whose boiling temperatures are between 150° C. and the temperature at which postcure heat-aging is carried out, usually, 250° C. (480° F.). Of course, it is to be understood that we do not advocate the use of a peroxide curing agent that will react explosively at the temperature employed in the mold-cure operation, or in a postcure heat-aging operation when an excess beyond that which will react completely is incorporated in the compound to be subjected to a mold-cure operation.

A polysiloxane containing an unsaturated hydrocarbon group of any size may be employed in practicing the invention if the unsaturated group contains a double bond in a position in which it is accessible for reaction. Among the unsaturated hydrocarbon substituent pendant groups that we prefer to employ are those that result in the production of hydrocarbon linkages among the chains of linear polysiloxanes.

As hereinbefore stated, use of the procedures, processes, polysiloxane gums and various compositions and compounds of the invention, facilitates the attainment of many advantageous results with respect to procedural matters, with respect to product quality and with respect to compositions and physical properties of silicone elastomers incapable of attainment through the use of the heretofore customary procedures, processes, polysiloxane gums, compositions and compounds.

Among the deficiencies of processes and procedures employed heretofore are (1) inability to produce elastomers having uniformly low compression sets, (2) inability to employ carbon black fillers effectively with the production of carbon black-filled elastomers, (3) inefficient curing agent utilization, (4) inability to control crosslinking effectively and (5) inability consistently to mold-cure and postcure heat-aged thick-section elastomers.

The compression sets of silicone elastomers produced in accordance with heretofore customary procedures are undesirably high, being usually above seventy percent, except when undesirable additive agents such, for example, as toxic chemical compounds of mercury and cadmium are employed. Such compounds cannot be eliminated in initial curing operations or in postcure heating operations, and their presence in silicone elastomers may be highly objectionable, particularly when the elastomers are to be employed for food and pharmaceutical uses.

The curing agents employed heretofore have been confined largely to classes of organic peroxides such, for example, as benzoyl peroxide and tertiary-butyl perbenzoate, which are strongly oxidizing. The presence of carbon black in a compound to be cured interferes with the action of the curing agent and results in the production of elastomers having poor physical properties.

Since the efficiency of utilization of the curing agent is poor, relatively large amounts must be employed. The use of excess curing agent results in the production of excessive amounts of harmful residues, including benzoic acid which functions as a silicone gum stock depolymerization catalyst.

Also, because of the inefficiency of utilization of curing agent, the crosslinking reaction is difficult or impossible to control accurately, and crosslinking, consequently, is haphazard or random rather than selective. Changes in strength of curing agents that take place during storage and variations in commercial products further complicate the matter of securing adequate and uniform crosslinking.

The production of sound thick-section products through mold-curing and postcure heat-aging is virtually impossible to achieve primarily because the chemical residues of heretofore customary curing agents when employed in accordance with heretofore customary procedures cannot escape during mold-curing, and, when they escape from the interior of a thick-section mold-cured elastomer during postcure heat-aging, they cause blowing and delamination and even depolymerization of the base gum throughout the center portions of thick-section moldings.

We have found it to be advisable to control the postcure heat-aging results through control of the unsaturated hydrocarbon groups. An excess amount of an unsaturated hydrocarbon group (such, for example, as a vinyl group) relatively to the amount of curing agent employed may, in the postcure heat-aging treatment, result in the production of postcure heat-aged products having undesirable properties. Therefore, in practicing our invention, we prefer to employ amounts of curing agents at least sufficient to effect utilization for crosslinking of all of the unsaturated hydrocarbon groups present in the gum stock employed. In other words, we prefer to employ gum stocks (as blends or copolymers) that contain unsaturated hydrocarbon groups in amounts sufficient to effect the degrees of crosslinking desired and to employ a curing agent in the heat-curing treatment in each case in amount sufficient effectively to cause all, or substantially all, of the unsaturated hydrocarbon groups to function as crosslinking agents or agencies in order that no appreciable amount of unsaturated hydrocarbon pendant group or groups will be present in the heat-cured product subjected to postcure heat-aging.

The use of hydrocarbon-substituted polysiloxanes containing unsaturated pendant hydrocarbon groups in accordance with our invention permits the utilization of procedures and processes devoid of the deficiencies of the heretofore customary processes and procedures. Polysiloxanes of the aforementioned types, containing unsaturated pendant hydrocarbon groups, may be employed with the greater advantage when employed in conjunction with a dialkyl peroxide curing agent in accordance with the invention.

Dialkyl peroxides employed by us react selectively to give crosslinking at the positions of the unsaturated hydrocarbon pendant groups. During the course of our research and development operations, the greater amount of our work was carried out with polysiloxanes consisting largely of dimethyl siloxane units and containing ethyl vinyl siloxane units and with the use of the dialkyl peroxide, di-tertiary-butyl peroxide as curing agent. Consequently, our recorded data showing the results of the use of such polysiloxanes and such dialkyl peroxide are the more complete, and, therefore, we shall include these data in tables at the end of this specification, and we shall refer to those tables in our discussion of various points hereinafter.

The selectivity of dialkyl peroxides as curing agents, referred to above, is demonstrated by the data set forth in Tables III, IV and VIII.

The tensile strength and hardness data set forth in Table III show low degrees of cures of linear polysiloxanes consisting essentially of dimethyl siloxane units, as compared with degrees of cures of linear polysiloxanes consisting essentially of large numbers of dimethyl siloxane units and small numbers of ethyl vinyl siloxane units. The products obtained in curing the linear polysiloxanes consisting essentially of dimethyl siloxane units were of very low quality, whereas the products obtained in curing the linear polysiloxanes consisting essentially of dimethyl polysiloxane units and ethyl vinyl siloxane units were of high quality.

Further evidence of the selectivity of the dialkyl peroxide, di-tertiary-butyl peroxide, is presented by the elongation and hardness data set forth in Table IV, which show that, for a linear polysiloxane gum containing a particular number of pendant vinyl groups, substantially the same degree of cure is accomplished regardless of the amount of curing agent employed within practical limits. The data set forth in Table IV demonstrate, also, the non-selective action of the highly reactive organic peroxide, benzoyl peroxide. The data showing increasing hardness and decreasing elongations of the products obtained in using increasing amounts of benzoyl peroxide indicate that crosslinking was effected between methyl groups as well as through vinyl groups.

The data set forth in Table VIII further demonstrate the selectivity of di-tertiary-butyl peroxide. The increasing hardness of the cured elastomers resulting from increases in the numbers or concentrations of vinyl groups show that close control of the state of cure of an elastomer can be accomplished through control of vinyl group concentrations in linear polysiloxane gums to be cured.

The data set forth in Tables V and X show that the compositions of a saturated hydrocarbon group may have little effect on some properties of a cured elastomer.

The data set forth in Table VI show the effectiveness of the unsaturated cyclohexenyl group in crosslinking.

The data set forth in Table VII show the effectiveness of unsaturated groups in the curing of copolymers containing aryl groups and saturated groups other than the methyl group.

As demonstrated by the data set forth in Table IX, crosslinking probably is accomplished through a mechanism involving the conversion of curing agents to free radicals which function selectively to remove hydrogen atoms from pendant methyl groups and other saturated groups, which modified saturated groups become adducts to pendant vinyl or other ethylenically unsaturated pendant groups, forming hydrocarbon linkages between the linear polysiloxane chains. This conclusion is supported by the fact that a blend of (1) a completely hydrocarbon-substituted linear polysiloxane whose pendant groups consisted entirely of methyl groups and (2) a completely hydrocarbon-substituted linear polysiloxane copolymer containing both methyl groups (in large amount) and vinyl groups (in small amount) was compounded with and cured by di-tertiary-butyl peroxide with the production of elastomers having physical properties equivalent to those obtained in curing a compound in which the only polysiloxane present was a completely hydrocarbon-substituted linear polysiloxane copolymer that consisted essentially of (1) dimethyl siloxane units and (2) vinyl groups in amount equivalent to the amount present in the blend of linear polysiloxanes.

The conclusion is supported, also, by the fact, as demonstrated by the data of Table IX, that a blend of (1) a linear completely hydrocarbon-substituted polysiloxane whose pendant hydrocarbon groups consisted only of methyl groups and (2) a cyclic polysiloxane whose pendant groups included two vinyl groups per molecule was cured by di-tertiary-butyl peroxide with the production of elastomers having satisfactory physical properties far superior to the properties of elastomers produced by curing with the same curing agent, a completely hydrocarbon-substituted linear polysiloxane whose pendant groups consisted entirely of saturated hydrocarbon groups. In employing cyclic polysiloxanes in such blending, it is essential that each molecule of the cyclic polysiloxanes contain at least two unsaturated pendant hydrocarbon groups.

The profound effect on compression set of the use of polysiloxanes containing unsaturated hydrocarbon substituent (or pendant) groups in conjunction with dialkyl peroxides is demonstrated by the data set forth in Table X.

The significant beneficial effects of employing precure aging treatments of the invention are shown by the data of Table XI. These data indicate that, generally, cured elastomers having low compression sets are not produced when an organic peroxide of any kind is employed for curing compounds in which the gum stocks employed consist of completely hydrocarbon-substituted polysiloxanes whose pendant groups consist entirely of saturated hydrocarbon groups. These data show, also, that gum stocks comprising unsaturated hydrocarbon pendant groups cured with a dialkyl peroxide produce silicone elastomers having the better compression set properties, and, also, that gum stocks comprising unsaturated hydrocarbon pendant groups produce silicone elastomers cured with any of the dialkyl peroxide curing agents having compression set properties better than those of elastomers produced in curing with other organic peroxides gum stock consisting essentially of completely hydrocarbon-substituted polysiloxanes whose substituents consist essentially of saturated hydrocarbon pendant groups such, for example, as methyl groups. Furthermore, the data indicate that the compression set properties become less desirable substantially in inverse proportion to the amounts of other organic peroxides employed for curing.

The data in Table XII show that the compression sets of polysiloxane gums of the invention that contain unsaturated pendant groups decrease in substantially inverse proportion to the amounts of unsaturated hydrocarbon groups contained in gum stock used in producing compounds to be cured.

Table XIII presents data illustrating the inability of polysiloxane gums cured in accordance with conventional heretofore customary procedures effectively to produce elastomers when compounded with carbon black and conventional curing agents, or, even with a dialkyl peroxide curing agent.

The data set forth in Table XIV demonstrate the effectiveness of dialkyl peroxides of promoting and effecting the production of high-quality carbon black-filled silicone elastomers when employed in compounds to be cured in conjunction with carbon black and with gum stocks consisting essentially of completely hydrocarbon-substituted linear polysiloxanes consisting essentially of (1) saturated hydrocarbon substituent (or pendant) groups (in large proportion) and (2) unsaturated hydrocarbon groups (in small proportion).

Table XV sets forth data showing results obtained in employing a number of carbon black products that are commercially available.

Table XVI shows the characteristics of available carbon black products and the qualities, cures and reinforcement obtained in efforts made to employ them in the production of silicone elastomers through compounding with a linear polysiloxane gum and a dialkyl peroxide, subsequently, subjecting the compounds to heat-curing and heat-aging treatments.

Table XVII sets forth data illustrating the advantages to be derived from the use of precure heat treatments and the use of alkaline neutralizing agents (or acid acceptors) in so conditioning carbon black products as to eliminate inherent disadvantageous properties and make them amenable for use in the production of carbon black-filled elastomers.

The data set forth in Tables XVIII and XIX show the striking advantage in thick-section curing that may be obtained in employing the linear polysiloxane gums of the invention and dialkyl peroxide curing agents, as compared with the virtually completely negative results obtained in utilizing gums, compounds and procedures in accordance with heretofore customary practices.

Table XX sets forth data showing the superiority of silicone elastomers of the invention over heretofore customary elastomers in resistance to deterioration under the influence of hydraulic brake fluids.

Table XXI sets forth data showing the capacities of silicone elastomers of the invention to resist deterioration when subjected to the action of saturated steam (water vapor) at an elevated temperature.

Table XXII has been presented for the purpose of illustrating the substantial equivalency among dialkyl peroxides employed as curing agents in practicing our invention.

Glossary

In the foregoing examples and the following tables, the following terms and expressions, where employed, are to be interpreted as indicated below.

A. MINIATURE PENETROMETER

The miniature penetrometer used in determining the hardness of silicone gums is a modification of the standard miniature penetrometer used in measuring the hardness or viscosity of a plastic substance, such as asphalt, made in accordance with suggestions contained in the article "Miniature Penetrometer for Determining the Conistency of Lubricating Greases," by Kaufman, Gus; Finn, W. J., and Harrington, R. J., Industrial and Engineering Chemistry, Analytic Edition, 11, 108–110 (1939).

In the modified miniature penetrometer, an aluminum plunger and penetrometer cone weighing 20 grams has been substituted for the steel plunger and penetrometer cone, weighing 150 grams, of the standard miniature penetrometer. Otherwise, the modified miniature penetrometer is of the same structure and dimensions as that described in the aforementioned article.

Silicone gum stock is tested for hardness by lowering the penetrometer cone with the plunger into contact with the surface of the gum stock with the indicator reading zero. Then the penetrometer cone with its plunger is released to permit downward movement under the influence of gravity for a period of 10 seconds, and the depth of penetration is shown in millimeters on an indicator associated with the device. The indicated penetration is identified as the miniature penetrometer reading (MPR).

B. COMPRESSION SET (ASTM D395–52T)

Degree of failure of a sample to return to its original size after removal of a deforming force.

Compression set tests are run by compressing a 1.129 inches diameter x 0.500 inch high cylindrical specimen either under a constant load, Methtod A, or at a definite fixed deflection, Method B. After the specimen has been compressed, it may be subjected to an elevated temperature for a fixed time (usually 22 hrs. at 70° C.), then the load is released; after a 30 minute rest, the permanent change in the height of the specimen is measured and the percent set calculated. A small value is desirable.

Compression set is expressed as percent of original deflection in Method B.

Compression set is expressed as percent of original thickness in Method A.

C. ELONGATION (ASTM D412–51T)

Amount of stretch of a sample under a tensile force expressed as a percentage of the original length.

$$\frac{\text{Stretched length} - \text{original length}}{\text{Original length}} \times 100$$

D. HARDNESS (ASTM D676–49T)

Degree of indentation produced by a plunger or indentor under a specific load. Measured with a Shore A Durometer. The value range from 0 to maximum hardness of 100.

E. SET AT BREAK

Measure of the permanent set of a specimen after being stretched to the breaking point, obtained by piecing the broken parts together and measuring the distance between the bench marks. Change is expressed in percent of the original length.

F. TEAR STRENGTH

Similar to tensile test, except that a different "right angle" dumbbell shape is used. Sample tears at the right angle. Force required to tear specimen divided by thickness is tear strength (lb./in.).

G. TENSILE STRENGTH (ASTM D412–49T)

The force necessary to rupture a rubber specimen when stretched to the breaking point divided by the original cross sectional area (lb./in.$^2$).

H. WILLIAMS PLASTICITY NUMBER

The thickness of a cylindrical sample of uncured elastomer after being deformed under a known weight. The recovery value represents the amount of return of the rubber after the weight has been removed.

In processes of the invention involving postcure heat-aging, heat aging may be carried out in any manner suitable for accomplishing the desired result, and any suitable maximum temperatures and any suitable periods of time may be employed. Thus, for example and by way of illustration, when a maximum temperature of about 480° F. is specified, the cured elastomer may be placed directly in an environment heated to and maintained at a temperature of 480° F. and permitted to reside in that environment until it reaches a temperature in equilibrium with the temperature of the environment, or, the temperature of the environment may be increased one or more times or decreased one or more times during a period of either continuous or intermittent residence of the elastomer therein. On the other hand, the elastomer may be placed, initially, in an environment having a temperature lower than 480° F., and, thereafter, the temperature of the environment may be raised step-wise, or from time to time, gradually or rapidly to a temperature of 480° F. The specified temperature of 480° F. is critical only to the extent that it represents the usual maximum temperature to which silicone elastomers may be subjected when employed in industry. When lower temperatures of employment are contemplated, lower postcure heat-aging temperatures may be employed, and, when higher temperatures of employment are contemplated, higher postcure heat-aging temperatures may be employed. The postcure heat-aging temperature and time employed with respect to any particular elastomer, if any, will be determined largely on the basis of the natures of volatile materials to be eliminated and the contemplated temperature of employment and, of course, on the basis of economic considerations.

It is to be understood that the products of the invention include, among others, siloxane gums of particular compositions containing, or free of, curing agent; compounds containing siloxane gum and filler material and containing, or free of, curing agent; precure-aged compounds, aged in any manner for any suitable periods of time as, for example, room temperature-aged compounds, aged for periods of time ranging from a fraction of an hour to a week or more and heat-aged compounds, aged at any suitable temperature for periods of time ranging from a fraction of an hour to several hours or several days; elastomers of all types, including carbon black-filled elastomers, elastomers filled with non-carbonaceous fillers and elastomers filled with both carbon black fillers and non-carbonaceous fillers; thick-section cured elastomers; thick-section cured and heat-aged elastomers; elastomers having particular physical properties; elastomers of all types cured with particular curing agents; and compounds, cured and uncured, formed with particular types of gums.

Because the phenyl group is relatively stable under conditions employed in carrying out a process of our invention, we consider that group to be a saturated group for the purposes of our invention, and we have included it among the saturated hydrocarbon groups through the specification and claims.

TABLE III

The data set forth below illustrate the selectivity of dialkyl peroxides in effecting crosslinking through unsaturated hydrocarbon groups.

Heat-curable compositions were formed by dispersing silica filler and a dialkyl peroxide curing agent in (1) a siloxane gum consisting essentially of dimethyl units (identified below, under Siloxane Gum, as Dimethyl) and in (2) a siloxane copolymer gum consisting essentially of dimethyl siloxane units (99.85 mole percent) and ethyl vinyl siloxane units (0.15 mole percent) (identified below, under Siloxane Gum, as Copolymer) in a Banbury mixer.

The silica filler was employed in amount equal to 43 parts by weight for each 100 parts by weight of Siloxane Gum.

The dialkyl peroxide, di-tertiary-butyl peroxide curing agent was employed in the amounts by weight indicated below, under Curing Agent Concentration per 100 parts by weight of Siloxane Gum.

| Siloxane Gum | Curing agent concentration | Elastomer properties (after 25 minutes at 340° F. mold-cure followed by 24 hours. Oven post-cure at 480° F.) | | |
|---|---|---|---|---|
| | | Tensile (p.s.i.) | Elongation (percent) | Hardness (Shore A) |
| Dimethyl | 0.6 | 154 | 130 | 66 |
| Copolymer | 0.4 | 895 | 250 | 78 |
| Et-Vi Copolymer | 0.6 | 828 | 250 | 77 |

2 WEEKS ROOM TEMP. AGING OF UNCURED STOCK. (CURING AGENT ADDED AFTER AGING)

| Dimethyl | 0.6 | 255 | 380 | 31 |
|---|---|---|---|---|
| Do | 1.0 | 205 | 340 | 33 |
| Copolymer | 0.4 | 910 | 200 | 48 |
| Do | 0.6 | 903 | 300 | 47 |

PRECURE HEAT AGING 2 HRS. AT 300° F. OF GUM+FILLER MIXTURE

| Dimethyl | 0.6 | 100 | 140 | 28 |
|---|---|---|---|---|
| Copolymer | 0.4 | 742 | 230 | 44 |
| Do | 0.6 | 720 | 220 | 46 |

TABLE IV

The following data illustrate the effects of different curing agent concentrations at constant concentrations of unsaturated hydrocarbon substituent groups with respect to each of two siloxane gums containing different concentrations of unsaturated hydrocarbon substituents.

A finely divided, solid silica filler and two different curing agents were dispersed in the two different siloxane gums in a Banbury mixer to produce heat-curable compositions. The silica filler was dispersed in each of the siloxane gums in an amount by weight equal to 43 parts per 100 parts by weight of gum. The curing agents employed were benzoyl peroxide and the dialkyl peroxide, di-tertiarybutyl peroxide. The amounts by weight of curing agents employed per 100 parts by weight of siloxane gum and the types of curing agents employed are indicated below under the headings, Curing Agent Concentration, and Curing Agent, respectively.

The compositions produced by mixing the components were precure heat-aged for 2 hours at 300° F., the heat-aged compositions were subjected to mold cure treatments, and the mold cured compositions were subjected to postcure heat treatments for 24 hours at 480° F.

| Curing agent | Curing agent concentration | Elastomer properties (after mold-cure followed by 24 hour oven postcure at 480° F.) | | |
|---|---|---|---|---|
| | | Tensile (p.s.i.) | Elongation (percent) | Hardness (Shore A) |
| Siloxane gum consisting essentially of dimethyl siloxane units (99.85 mole percent) and ethyl vinyl units (0.15 mole percent): | | | | |
| Di-tertiarybutyl peroxide | 0.20 | 750 | 220 | 42 |
| Do | 0.40 | 740 | 230 | 44 |
| Do | 0.60 | 720 | 220 | 46 |
| Benzoyl peroxide | 0.20 | 490 | 270 | 30 |
| Do | 0.40 | 750 | 230 | 38 |
| Do | 0.60 | 820 | 180 | 46 |
| Siloxane gum consisting essentially of dimethyl siloxane units (99.44 mole percent) and ethyl vinyl siloxane units (0.56 mole percent): | | | | |
| Di-tertiarybutyl peroxide | 0.20 | 770 | 100 | 60 |
| Do | 0.40 | 725 | 80 | 62 |
| Do | 0.60 | 740 | 80 | 62 |
| Benzoyl peroxide | 0.20 | 540 | 220 | 37 |
| Do | 0.40 | 750 | 170 | 48 |
| Do | 0.60 | 720 | 120 | 55 |

TABLE V

*Comparison of various vinyl organic siloxane additives for dimethyl siloxane gums*

Banbury mixed: Precure heat-aged 2 hours at 300° F.
Composition (parts by weight):
   100 parts gum
   45 parts Santocel "CS" (silica filler)
   0.7 part DTBP (di-tertiarybutyl peroxide)

| Vinyl organic siloxane additive | Concentration of vinyl additive in gum (mole percent) | Elastomer properties (mold-cure followed by 24 hour oven postcure at 480° F.) | | |
|---|---|---|---|---|
| | | Tensile (p.s.i.) | Elongation (percent) | Hardness (Shore A) |
| $\begin{array}{c}C_2H_5\\|\\-Si-O-\\|\\CH=CH_2\end{array}$ | 0.15 | 765 | 270 | 45 |
| $\begin{array}{c}CH_3\\|\\-Si-O-\\|\\CH=CH_2\end{array}$ | 0.15 | 925 | 250 | 45 |
| $\begin{array}{c}\phi\\|\\-Si-O-\\|\\CH=CH_2\end{array}$ | 0.15 | 780 | 250 | 48 |
| None (dimethyl gum) | 0.0 | 100 | 140 | 28 |

TABLE VI

*(Cyclohexenyl RSiO) as the crosslinking group*

Roll mill mixed: Immediate cure.
Composition (parts by weight):
   100 parts gum
   35 parts Santocel "CS" (silica filler)
   0.7 part DTBP (di-tertiarybutyl peroxide)

| Mole percent of cyclohexenyl ethyl siloxane in gum | Elastomer properties after mold-cure followed by 24 hour postcure at 480° F. | | |
|---|---|---|---|
| | Tensile (p.s.i.) | Elongation (percent) | Hardness (Shore A) |
| 0.15 | 544 | 475 | 68 |
| 0.50 | 705 | 125 | 85 |
| 0.0 (dimethyl gum) | No cure. | | |

The following table, Table VII, includes data obtained in employing copolymers comprising Para - dimethylsilylenphenyldimethylsiloxane units, which units can be identified as Bis-para (dimethyl oxysilyl) benzene units and they have been so identified in the appended claims for convenience.

TABLE VII

*Vinyl cures of various copolymers*

Roll mill mixed: immediate cure
Composition (parts by weight):
    100 parts gum
    35 parts Santocel "CS" (silica filler)
    0.6 part DTBP (di-tertiary butyl peroxide)

| Ethyl vinyl siloxane content (mole percent) | Polymer composition (mole percent) | Elastomer properties (after mold-cure+24 hr. postcure at 480° F.) | | |
|---|---|---|---|---|
| | | Tensile (p.s.i.) | Elongation (percent) | Hardness (Shore A) |
| 0.18 | 3% diphenyl siloxane units, 96.82% dimethyl siloxane units. | 885 | 250 | 75 |
| 0.18 | 5% diphenyl siloxane units, 94.82% dimethyl siloxane units. | 935 | 250 | 70 |
| 0.18 | 1% phenyl methyl siloxane units, 98.85% dimethyl siloxane units. | 868 | 200 | 80 |
| 0.18 | 4% phenyl methyl siloxane units, 95.85% dimethyl siloxane units. | 905 | 285 | 77 |
| 0.15 | 1% para-dimethyl-silylenphenyldimethylsiloxane units, 98.85% dimethylsiloxane units. | 745 | 260 | 75 |
| 0.15 | 4% para-dimethyl-silylenphenyldimethylsiloxane units, 95.85% dimethylsiloxane units. | 748 | 285 | 75 |
| None [1] | 100% diethyl siloxane units | [2] 1,073 | [2] 410 | 25 |

[1] Precure heat-aged 1 hour at 300° F.
[2] Mold cure properties only with 1.0 part DTBP.

The para-dimethylsilylenphenyldimethylsiloxane units referred to above may be represented by the structural formula:

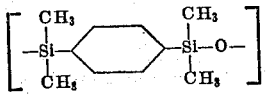

TABLE VIII

*Effect of varying vinyl group concentrations*

Banbury mixed: Precure heat-aged 2 hours at 300° F.
Composition (parts by weight):
    100 parts gum
    43 parts Santocel "CS" (silica filler)
    0.4 part DTBP (di-tertiary-butyl peroxide)

| Concentration of dimethyl siloxane units (mole percent) | Concentration of ethyl vinyl siloxane units (mole percent) | Elastomer properties (after mold-cure followed by 24 hour oven postcure at 480° F.) | | |
|---|---|---|---|---|
| | | Tensile (p.s.i.) | Elongation (percent) | Hardness (Shore A) |
| 99.90 | 0.10 | 738 | 310 | 35 |
| 99.85 | 0.15 | 742 | 230 | 44 |
| 99.44 | 0.56 | 723 | 80 | 62 |

TABLE IX

*Miscellaneous cures through the vinyl group*

Roll mill mixed: Precure heat-aged 2-6 hours at 300° F.
Composition (parts by weight):
    100 parts gum
    35 parts Santocel "CS" (silica filler)
    0.7 part DTBP (di-tertiary-butyl peroxide)

| Composition of base polymer | Special additive to compound | Elastomer properties (after mold-cure followed by 24 hour oven postcure at 480° F.) | | |
|---|---|---|---|---|
| | | Tensile (p.s.i.) | Elongation (percent) | Hardness (Shore A) |
| Dimethyl gum | None | 90 | 190 | 36 |
| Dimethyl gum | 0.70 part of tetramer (EtViSiO)$_2$(Me$_2$SiO)$_2$. | 500 | 500 | 39 |
| Blend [1] | None | 750 | 250 | 51 |

[1] The blend consisted of 66 parts by weight of dimethyl siloxane gum and 34 parts by weight of copolymer gum containing 0.56 mole percent of ethyl vinyl siloxane units and 99.44 mole percent of dimethyl siloxane units.

TABLE X

*Compression set of vinyl-DTBP cured elastomers*

Roll mill mixed: Precure heat-aged 2 hours at 300° F.
Composition (parts by weight):
    100 parts gum
    45 parts Santocel "CS" (silica filler)
    0.7 part DTBP (di-tertiary-butyl peroxide)

| Polymer composition (mole percent) | Compression set (after 24 hours postcure at 480° F.) (Method B, ASTM 395-52T, 70 hours at 300° F., percent of original deflection) |
|---|---|
| 0.15% ethyl vinyl siloxane units, 99.85% dimethyl siloxane units | 12 |
| 0.15% methyl vinyl siloxane units, 99.85% dimethyl siloxane units | 9 |
| 0.15% phenyl vinyl siloxane units, 99.85% dimethyl siloxane units | 10 |
| 100% dimethyl siloxane units (cured with 2.0 parts benzoyl peroxide) | 72 |

TABLE XI

*Effect of curing agents and polymers on compression set*

Dimethyl polysiloxane gum (identified below as "Dimethyl Gum") and dimethyl polysiloxane gum containing ethyl vinyl siloxane units (identified below by the mole percent concentration of ethyl vinyl siloxane units)
Banbury mixed:
    100 parts gum
    43 parts Santocel "CS" (silica filler)

| Ethyl vinyl siloxane concentration (mole percent) | Curing agent | | Compression set (Method B, ASTM 395-52T 96 hr. at 350° F.) (except as indicated), percent of original deflection |
|---|---|---|---|
| | Kind | Concentration (parts per 100 parts gum, both by weight) | |

A. IMMEDIATE CURE

| | | | |
|---|---|---|---|
| Dimethyl gum | DTBP | 1.0 | Only slight cure. |
| Do | DTBP | 2.0 | Do. |
| Do | TBPB | 1.0 | Do. |
| Do | TBPB | 2.0 | 69 (22 hr. at 350° F.). |
| Do | Bz$_2$O$_2$ | 1.0 | Only slight cure. |
| Do | Bz$_2$O$_2$ | 2.0 | 56 (22 hr. at 350° F.). |
| 0.15 | DTBP | 0.6 | 36. |
| 0.15 | DTBP | 1.0 | 31. |
| 0.15 | TBPB | 0.6 | 42. |
| 0.15 | TBPB | 1.0 | 55. |
| 0.15 | Bz$_2$O$_2$ | 0.6 | 55. |
| 0.15 | Bz$_2$O$_2$ | 1.0 | 68. |

B. ROOM TEMPERATURE AGED (2 WEEKS)

| | | | |
|---|---|---|---|
| Dimethyl gum | DTBP | 2.0 | Only slight cure. |
| Do | TBPB | 2.0 | 73 (22 hr. at 350° F.). |
| Do | Bz$_2$O$_2$ | 2.0 | 85 (22 hr. at 350° F.). |
| 0.15 | DTBP | 0.6 | 23. |
| 0.15 | DTBP | 1.0 | 22. |
| 0.15 | TBPB | 0.6 | 28. |
| 0.15 | TBPB | 1.0 | 35. |
| 0.15 | Bz$_2$O$_2$ | 0.6 | 33. |
| 0.15 | Bz$_2$O$_2$ | 1.0 | 47. |

C. PRECURE HEAT-AGED (2 HR. AT 300° F.)

| | | | |
|---|---|---|---|
| Dimethyl gum | DTBP | 2.0 | 39. |
| Do | TBPB | 1.0 | 82. |
| Do | TBPB | 2.0 | 92. |
| Do | Bz$_2$O$_2$ | 0.6 | 82. |
| Do | Bz$_2$O$_2$ | 2.0 | 89. |
| 0.15 | DTBP | 1.0 | 19. |
| 0.15 | TBPB | 1.0 | 46. |
| 0.15 | Bz$_2$O$_2$ | 1.0 | 57. |
| 0.15 | Bz$_2$O$_2$ | 2.0 | 83. |

DTBP = di-tert-butyl peroxide.
TBPB = tert-butyl perbenzoate.
Bz$_2$O$_2$ = benzoyl peroxide.
Parts = parts by weight.

TABLE XII

*Effect of vinyl concentration on compression set*

Banbury mixed: Precure heat-aged 2 hours at 300° F.
Composition (parts by weight):
    100 parts gum
    43 parts Santocel "CS" (silica filler)
    0.6 part DTBP (di-tertiary-butyl peroxide)

| Ethyl vinyl siloxane concentration (mole percent) | Compression set (Method B, ASTM 395-52T 70 hours at 350° F. percent of original deflection) |
|---|---|
| 0.10 | 30 |
| 0.15 | 18 |
| 0.56 | 11 |

TABLE XIII

*Carbon black-filled compounds with conventional cures*

PART I

| Polymer composition (mole percent) | Mold cure (minutes at ° F.) | Curing agent (parts per 100 parts gum, both by weight) | Filler (parts per 100 parts gum, both by weight) |
|---|---|---|---|
| A | Dimethyl | 10 at 250 | 5.0 Bz$_2$O$_2$ | 25.0 Furnex (SRF). |
| B | do | 25 at 340 | 3.0 DTBP | 45 Philblack A (MAF). |
| C | do | 50 at 340 | do | Do. |
| D[1] | do | do | do | Do. |
| E[1] | Diethyl | 20 at 250 | 2.3 Bz$_2$O$_2$ | Do. |
| F | 0.19 Et-Vi[2] | 15 at 250 | 2.0 Bz$_2$O$_2$ | 40 Philblack O (HAF). |
| G | do | do | 4.0 Bz$_2$O$_2$ | Do. |
| H | do | do | 6.0 Bz$_2$O$_2$ | Do. |

PART II.—ELASTOMER PROPERTIES

| | Mold cured | | | Postcured | | |
|---|---|---|---|---|---|---|
| | Tensile (p.s.i.) | Elongation (percent) | Hardness (Shore A) | Tensile (p.s.i.) | Elongation (percent) | Hardness (Shore A) |
| A | 200 | 230 | 29 | — | — | — |
| B | | | | | | |
| C | | NO CURE | | | NO CURE | |
| D | | | | | | |
| E | | | | | | |
| F | | | | | | |
| G | | | | | | |
| H | [3] 330 | 1,025 | 25 | 405 | 180 | 60 |

[1] Precure heat-aged 18 hr. at 300° F.
[2] Copolymer consisting essentially of dimethyl siloxane units (99.81%) and ethyl vinyl siloxane units (0.19%).
[3] Undercured; high set at break, 76%.

Bz$_2$O$_2$ = Benzoyl peroxide.
DTBP = Di-tertiary-butyl peroxide.

TABLE XIV

*Carbon black-filled compounds with DTBP-vinyl cures*

[A mold-cured 15 minutes at 250° F. Others mold-cured 25 minutes at 340° F.]

PART I

| Polymer composition (mole percent) | Catalyst (parts per 100 parts by weight) | Filler (parts per 100 parts by weight) |
|---|---|---|
| A | 0.19 Et-Vi | 4.0 Bz$_2$O$_2$ | 40 Philblack O (HAF). |
| B | 0.19 Et-Vi | 2.0 DTBP | Do. |
| C | 0.19 Et-Vi | 2.0 DTBP | 40 Philblack A (MAF). |
| D | 0.19 Et-Vi | 2.0 DTBP | 40 Vulcan 3 (HAF). |
| E | 0.19 Et-Vi | 2.0 DTBP | 40 Sterling V (GPF). |
| F | 0.19 Et-Vi | 2.0 DTBP | 40 Continex (HAF). |
| G | 0.19 Et-Vi | 2.0 DTBP | 40 Aromex (HAF). |

PART II.—ELASTOMER PROPERTIES

| | Mold-Cured | | | Postcured | | |
|---|---|---|---|---|---|---|
| | Tensile (p.s.i.) | Elongation (percent) | Hardness (Shore A) | Tensile (p.s.i.) | Elongation (percent) | Hardness (Shore A) |
| A | | NO CURE | | | NO CURE | |
| B | 940 | 360 | 41 | 800 | 305 | 54 |
| C | 740 | 300 | 39 | 555 | 265 | 52 |
| D | 970 | 355 | 43 | 840 | 335 | 50 |
| E | 810 | 310 | 42 | 560 | 285 | 47 |
| F | 930 | 355 | 41 | 600 | 270 | 52 |
| G | 750 | 325 | 39 | 750 | 295 | 56 |

Bz$_2$O$_2$ = Benzoyl peroxide.
DTBP = Di-tertiary-butyl peroxide.

TABLE XV

Properties of various types of carbon black filled elastomer

Roll mill mixed: 24 hours room temperature aged
Composition (parts by weight):
  100 parts 0.19 mole percent ethyl vinyl siloxane units
  40 parts carbon black
  2.0 parts DTBP (di-tertiary-butyl peroxide)

PART I

| Carbon Black | Type | Mold-cure properties (30 min. at 340° F.) | | |
|---|---|---|---|---|
| | | Tensile (p.s.i.) | Elongation (percent) | Hardness (Shore A) |
| Micronex Mark II | HPC | | | |
| Micronex | MPC | | | |
| Micronex W-6 | EPC | | | |
| Spheron N | CC | NO CURE | | |
| Spheron 9 | EPC | | | |
| Aromex 115 | SAF | | | |
| Statex R | HAF | | | |
| Wyex | EPC | | | |
| P-33 | FT | 80 | 170 | 33 |
| Thermax | MT | 110 | 247 | 27 |
| Furnex | SRF | 300 | 217 | 38 |
| Statex B | FF | 280 | 247 | 38 |
| Statex 93 | HMF | 380 | 227 | 41 |
| Statex 125 | CF | 390 | 397 | 30 |

PART II

| Carbon Black | Type | Postcured properties (24 hours oven-cure at 480° F.) | | |
|---|---|---|---|---|
| | | Tensile (p.s.i.) | Elongation (percent) | Hardness (Shore A) |
| Micronex Mark II | HPC | | | |
| Micronex | MPC | | | |
| Micronex W-6 | EPC | | | |
| Spheron N | CC | NO CURE | | |
| Spheron 9 | EPC | | | |
| Aromex 115 | SAF | | | |
| Statex R | HAF | | | |
| Wyex | EPC | | | |
| P-33 | FT | 150 | 210 | 31 |
| Thermax | MT | 150 | 290 | 24 |
| Furnex | SRF | 250 | 207 | 42 |
| Statex B | FF | 310 | 203 | 46 |
| Statex 93 | HMF | 350 | 207 | 49 |
| Statex 125 | CF | 370 | 93 | 76 |

TABLE XVI

Relationship of carbon black properties to curing characteristics in Et-Vi gum with DTBP

| Name | Type | pH | Particle size (A.) | Volatiles (wt. percent) | Cure |
|---|---|---|---|---|---|
| Micronex Mark II | HPC | | | | No cure. |
| Micronex | MPC | 4.4 | 280 | 5.5 | Do. |
| Micronex W-6 | EPC | 4.8 | 290 | 5.5 | Do. |
| Spheron N | CC | 4.5 | 220 | 5.0 | Do. |
| Spheron 9 | EPC | 3.8 | 345 | 5.0 | Do. |
| Wyex | EPC | 4.5 | 300 | 6.0 | Do. |
| Aromex 115 | SAF | 9.3 | 270 | 1.2 | Do. |
| Statex 125 | CF | | | | Cure (medium reinforcement). |
| Statex B | FF | 9.3 | 430 | 0.5 | Do. |
| Statex 93 | HMF | 9.5 | 580 | 0.5 | Do. |
| Furnex | SRF | 10.0 | 850 | 0.5 | Do. |
| P-33 | FT | 8.0 | 1,500 | 0.3 | Cure (low reinforcement). |
| Thermax | MT | 7.6 | 3,000 | | Do. |
| Statex R | HAF | 9.0 | 280 | 1.0 | Do. |
| Philblack O | HAF | 9.1 | 360 | 1.1 | Cure (good reinforcement). |
| Philblack A | MAF | 9.7 | 590 | 1.1 | Do. |
| Continex | HAF | 9.5 | 330 | 2.0 | Do. |
| Sterling V | GPF | | 745 | | Do. |
| Aromex | HAF | 9.3 | 300 | 1.2 | Do. |
| Vulcan 3 | HAF | 9.0 | 365 | 1.0 | Do. |

TABLE XVII

Use of precure heat-aging and acid acceptors in carbon black filled compounds

RECIPES AND HEAT TREATMENTS

A. 100 parts by weight of gum containing 0.19 mole percent of ethyl vinyl siloxane units and 99.81 mole percent (approximately) of dimethyl siloxane units. 40 parts by weight of Micronex W-6. 2 parts by weight of di-tertiary-butyl peroxide.

Subjected immediately to heat-curing treatments.

B. 100 parts by weight of gum containing 0.19 mole percent of ethyl vinyl siloxane units and 99.81 mole percent (approximately) of dimethyl siloxane units. 40 parts by weight of Micronex W-6. 2 parts by weight of di-tertiary-butyl peroxide.

Subjected to precure heat-aging treatment for 2 hours at 300° F. prior to heat-curing treatment.

C. 100 parts by weight of gum containing 0.19 mole percent of ethyl vinyl siloxane units and 99.81 mole percent (approximately) of dimethyl siloxane units. 40 parts by weight of Micronex W-6. 2 parts by weight of di-tertiary-butyl peroxide. 5 parts by weight of Witcarb R (finely divided calcium carbonate).

Subjected immediately to heat-curing treatment.

| | Mold-cured properties (30 minutes at 340° F.) | | | Postcure heat-aged properties (24 hours at 480° F.) | | |
|---|---|---|---|---|---|---|
| | Tensile (p.s.i.) | Elongation (percent) | Hardness (Shore A) | Tensile (p.s.i.) | Elongation (percent) | Hardness (Shore A) |
| A | No Cure | | | No Cure | | |
| B | 390 | 275 | 39 | 490 | 220 | 59 |
| C | 420 | 470 | 28 | 370 | 165 | 66 |

TABLE XVIII

Heat-aging of dimethyl gum thick section moldings

Banbury mixed: Precure heat-aged 2 huors at 300° F. (100 parts by weight of gum consisting essentially of dimethyl siloxane units. 43 parts Santocel "CS.")

| Curing agent | Mold-cure properties | | | |
|---|---|---|---|---|
| | Hardness (Shore A) | | Center discoloration | Delamination and blowing |
| | At side | At center | | |
| 0.6 parts benzoyl peroxide | 40 | 40 | None | None. |
| 2.0 parts tertiary-butyl perbenzoate | 42 | 42 | do | Do. |
| 2.0 parts di-tertiary-butyl peroxide | 41 | 41 | do | Do. |

TABLE XVIII—Continued

| Curing agent | Postcure heat-aged properties (24 hours at 480° F.) | | | |
|---|---|---|---|---|
| | Hardness (Shore A) | | Center discoloration | Delamination and blowing |
| | At side | At center | | |
| 0.6 parts benzoyl peroxide. | 55–60 | Very soft | Much | Much. |
| 2.0 parts tertiary-butyl perbenzoate. | 55–60 | ___do___ | ___do___ | Do. |
| 2.0 parts di-tertiary-butyl peroxide. | 45 | ___do___ | ___do___ | Do. |

TABLE XIX

*Heat-aging of vinyl-containing gum thick-section moldings*

100 parts by weight of gum containing 0.15 mole percent ethyl vinyl siloxane units and 99.85 percent (approximately) of dimethyl siloxane units. 43 parts by weight Santocel "CS" (finely divided silica)

| Curing agent | Mold-cure properties | | | |
|---|---|---|---|---|
| | Hardness (Shore A) | | Center discoloration | Delamination and blowing |
| | At side | At center | | |

PRECURE HEAT-AGED 2 HOURS AT 300° F. (BANBURY MIXED)

| | | | | | |
|---|---|---|---|---|---|
| A | 0.6 part benzoyl peroxide. | 58 | 58 | None | None. |
| B | 0.6 part tertiary-butyl perbenzoate. | 57 | 57 | ___do___ | Do. |
| C | 0.6 part di-tertiary-butyl peroxide. | 57 | 57 | ___do___ | Do. |

ROOM TEMPERATURE, AGED 2 WEEKS (ROLL-MILL MIXED)

| | | | | | |
|---|---|---|---|---|---|
| D | 0.6 parts di-tertiary-butyl peroxide. | 51 | 51 | None | None. |

IMMEDIATE CURE (ROLL-MILL MIXED)

| | | | | | |
|---|---|---|---|---|---|
| E | 0.6 parts di-tertiary-butyl peroxide. | 72 | 72 | None | None. |

POSTCURE HEAT-AGED 24 HOURS AT 480°F.

| | Post-cure heat-aged properties | | | |
|---|---|---|---|---|
| | Hardness (Shore A) | | Center discoloration | Delamination and blowing |
| | At side | At center | | |
| A | 55 | Very soft | Much | Much. |
| B | 57 | ___do___ | ___do___ | Do. |
| C | 55 | 35 | Slight | None. |
| D | 55 | 44 | Very slight | Do. |
| E | 80 | 70 | ___do___ | Do. |

TABLE XX

The data contained in this table demonstrate the superior quality of resistance to hydraulic brake fluids of silicone elastomers of the invention, as compared with heretofore customary types of silicone elastomers.

Three elastomers were prepared and tested. In the preparation of one, gum stock "A," which consisted essentially of linear dimethyl polysiloxanes was employed. In the preparation of another, gum stock "B," a copolymer of the invention, comprising linear polysiloxanes consisting essentially of dimethyl siloxane units (99.65 percent by weight) and ethyl vinyl siloxane units (0.35 percent by weight=0.26 mole percent), was employed. In the preparation of the third, gum stock "C," a copolymer of the invention, comprising linear polysiloxanes consisting essentially of dimethyl siloxane units (99.80 percent by weight) and ethyl vinyl siloxane units (0.20 percent by weight) was employed.

The elastomers were prepared and tested in accordance with the procedures and with the results indicated by the data set forth below. (The parts referred to are parts by weight.)

| Gumstock | "A" | "B" | "C" |
|---|---|---|---|
| Composition of elastomer: | | | |
| Gumstock, parts | 100 | 100 | 100 |
| Santocel "CS," parts | 45 | 40 | 45 |
| Superfloss, parts | 10 | 5 | 10 |
| Superpax, parts | 3 | | 3 |
| Benzoyl peroxide, parts | 2 | | |
| Di-tertiary-butyl peroxide, parts | | 0.8 | 0.8 |
| Cure: | | | |
| Time in minutes | 15 | 25 | 25 |
| Temperature, °F | 250 | 340 | 340 |
| Postcure heat-aging properties: | | | |
| Hardness (Shore "A") | 76 | 72 | 76 |
| Tensile (p.s.i.) | 480 | 940 | 870 |
| Elongation (percent) | 140 | 230 | 230 |
| Immersion tests: | | | |
| Brake fluid | Delco 9 | Delco 9 | Delco 9 |
| Fluid temperature, °C | 96 | 96 | 96 |
| Days immersed | 10 | 10 | 10 |
| Final properties: | | | |
| Hardness (Shore "A") | 62 | 68 | 70 |
| Tensile (p.s.i.) | 140 | 795 | 820 |
| Elongation (percent) | 60 | 230 | 240 |
| Extent of change: | | | |
| Hardness (Shore "A" units) | −14 | −4 | −6 |
| Tensile, percent | −71 | −15 | 6 |
| Elongation (percent) | −57 | 0 | 0 |
| Weight gain (percent) | 2.5 | 4.5 | 4.3 |
| Weight loss of rubber after heating in air and circulating oven for one hour at 300° F. (150° C.) | 1.8 | 0 | 0 |
| Weight absorption of fluid | 4.3 | 4.3 | 4.0 |

TABLE XXI

The data set forth below illustrate capacity of silicone elastomers of the invention to resist deterioration under the influence of saturated steam (water vapor). Two different polysiloxane gum stocks were employed in preparing elastomers for testing purposes. One gum stock, A, comprised linear polysiloxanes consisting essentially of dimethyl siloxane units. The other gum stock, B, comprised linear polysiloxane copolymers of the invention consisting essentially of dimethyl siloxane units (99.65 percent by weight) and ethyl vinyl units (0.35 percent by weight).

One recipe containing gum stock A was employed, benzoyl peroxide being incorporated, and two recipes employing gum stock B were employed, one having benzoyl peroxide incorporated therein and the other having di-tertiary-butyl peroxide incorporated therein. Otherwise, the recipes were identical.

The procedures followed in producing elastomers and in testing, and the results obtained, are indicated by the data set forth below:

| Recipe | 13 | 5B | 82 |
|---|---|---|---|
| Parts by weight: | | | |
| Gumstock A | 100 | | |
| Gumstock B | | 100 | |
| Santocel "CS" | 40 | 40 | 40 |
| Di-tertiary-butyl peroxide | | 0.8 | |
| Benzoyl peroxide | 2 | | 0.6 |
| Postcure heat-aged properties: | | | |
| Tensile (p.s.i.) | 650 | 860 | 570 |
| Elongation (percent) | 210 | 230 | 220 |
| Hardness (Shore A) | 54 | 57 | 64 |
| Weight (grams) | 4.35 | 4.28 | 5.03 |
| Thickness (inches) | .076 | .075 | .088 |
| Properties after test: | | | |
| Pressure (p.s.i.g.) | 100 | 100 | 100 |
| Time (hours) | 22 | 23 | 24 |
| Tensile (p.s.i.) | 150 | 540 | 360 |
| Elongation (percent) | 150 | 210 | 180 |
| Hardness (Shore A) | 28 | 48 | 58 |
| Weight (percent) | 5.66 | 4.71 | 5.45 |
| Thickness (inches) | .082 | .077 | .089 |
| Change in properties: | | | |
| Tensile (percent) | −77 | −37 | −37 |
| Elongation (percent) | −29 | −9 | −18 |
| Hardness difference | −26 | −9 | −6 |
| Weight (percent) | +30 | +10 | +8 |
| Thickness (percent) | +8 | +3 | +1 |

TABLE XXII

This table is presented for the purpose of illustrating the substantial equivalency among dialkyl peroxides employed in practicing our invention.

The data set forth below were obtained through tests conducted on elastomers produced in compounding, immediate mold curing after milling and postcure heat-aging of recipes containing the indicated components in the proportions, for the periods of time and at the temperatures set forth.

In each instance, there was employed a recipe containing a polysiloxane gum comprising linear polysiloxanes consisting essentially of dimethyl siloxane units (99.65 percent by weight) and ethyl vinyl siloxane units (0.35 percent by weight=0.26 mole percent), Santocel CS filler and a di-tertiary-butyl peroxide curing agent of the type indicated. (All parts referred to are parts by weight.)

SECTION I

| | Type of peroxide employed | Amount of peroxide in parts per 100 parts of gum | Amount of filler employed in parts per 100 parts of gum | Time and temperature employed in mold cure |
|---|---|---|---|---|
| A | Tertiary-butyl-tertiary triptyl peroxide | 1.29 | 35 | 25 minutes at 340° F. |
| B | Di-tertiary-butyl peroxide | 1.00 | 35 | Do. |
| C | Tertiary-butyl-tertiary-triptyl peroxide | 1.03 | 40 | Do. |
| D | Di-tertiary-butyl peroxide | 0.80 | 40 | Do. |
| E | Tertiary-butyl triethyl-methyl peroxide | 1.29 | 40 | Do. |
| F | do | 1.29 | 40 | 60 minutes at 340° F. |
| G | do | 1.29 | 40 | 25 minutes at 356° F. |

SECTION II

| | After mold-cure | | | After postcure heat-aging at 480° F. for 24 hours | | |
|---|---|---|---|---|---|---|
| | Tensile strength (p.s.i.) | Elongation (percent) | Hardness (Shore A) | Tensile strength (p.s.i.) | Elongation (percent) | Hardness (Shore A) |
| A | 603 | 770 | 38 | 510 | 370 | 57 |
| B | 660 | 500 | 38 | 570 | 300 | 59 |
| C | 710 | 700 | 50 | 560 | 300 | 70 |
| D | 790 | 460 | 56 | 600 | 225 | 71 |
| E | 700 | 500 | 53 | 510 | 240 | 69 |
| F | 710 | 490 | 55 | 610 | 260 | 68 |
| G | 780 | 480 | 53 | 700 | 290 | 68 |

It is to be understood that the theories set forth herein are provided for purposes of illustration and explanation and not for purposes of limitation.

We claim:

1. A heat-curable gum stock composition that comprises (1) a hydrocarbon-substituted polysiloxane gum wherein the siloxane units consist essentially of (a) at least one of the units selected from the class consisting of dimethylsiloxane, methylphenylsiloxane and diphenylsiloxane, and (b) at least one of the units selected from the class consisting of methylvinylsiloxane, ethylvinylsiloxane, and phenylvinylsiloxane, the ratio of hydrocarbon groups to silicon atoms being about 2 and from about 0.037 to about 0.74 percent of the silicon atoms in said gum being bonded to vinyl groups, (2) a peroxide curing agent selected from the class consisting of compounds represented by the formulas:

and

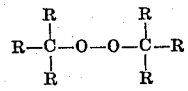

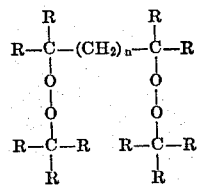

wherein R is an alkyl radical containing from 1 to 3 carbon atoms and $n$ is a multiplier selected from the group consisting of whole numbers and zero, and (3) a filler material.

2. A heat-curable gum stock composition that comprises (1) a hydrocarbon-substituted polysiloxane gum consisting essentially of dimethylsiloxane units and ethylvinylsiloxane units, the ratio of hydrocarbon groups to silicon atoms being about 2 and from about 0.037 to about 0.74 percent of the silicon atoms in said gum being bonded to vinyl groups, (2) di-tertiary-butyl peroxide, and (3) a silica filler.

3. A heat-curable gum stock composition that comprises (1) a hydrocarbon-substituted polysiloxane gum consisting essentially of dimethylsiloxane units and ethylvinylsiloxane units, the ratio of hydrocarbon groups to silicon atoms being about 2 and from about 0.037 to about 0.74 percent of the silicon atoms in said gum being bonded to vinyl groups, (2) di-tertiary-butyl peroxide, and (3) a carbon black filler.

4. A heat-curable gum stock composition that comprises (1) a hydrocarbon-substituted polysiloxane gum consisting essentially of dimethylsiloxane units and methylvinylsiloxane units, the ratio of hydrocarbon groups to silicon atoms being about 2 and from about 0.037 to about 0.74 percent of the silicon atoms in said gum being bonded to vinyl groups, (2) di-tertiary-butyl peroxide, and (3) a silica filler.

5. A heat-curable gum stock composition that comprises (1) a hydrocarbon-substituted polysiloxane gum consisting essentially of dimethylsiloxane units, phenylmethylsiloxane units and ethylvinylsiloxane units, the ratio of hydrocarbon groups to silicon atoms being about 2 and from about 0.037 to about 0.74 percent of the silicon atoms in said gum being bonded to vinyl groups, (2) di-tertiary-butyl peroxide, and (3) a silica filler.

References Cited by the Examiner

UNITED STATES PATENTS

| 2,420,911 | 3/47 | Roedel | 260—46.5 |
| 2,420,912 | 3/47 | Hurd | 260—46.5 |
| 2,426,476 | 8/47 | Vaughan et al. | 260—78.4 |
| 2,445,794 | 7/48 | Marsden | 260—46.5 |
| 2,448,530 | 9/48 | Jones | 260—37 |

(Other references on following page)

UNITED STATES PATENTS

| | | | |
|---|---|---|---|
| 2,448,756 | 9/48 | Agens | 260—46.5 |
| 2,521,528 | 9/50 | Marsden | 260—46.5 |
| 2,557,928 | 6/51 | Atkinson | 260—46.5 |
| 2,714,099 | 7/55 | Weyenberg | 260—46.5 |
| 2,803,619 | 8/57 | Dickmann | 260—46.5 |

FOREIGN PATENTS

| | | |
|---|---|---|
| 596,668 | 1/48 | Great Britain. |
| 620,692 | 3/49 | Great Britain. |

OTHER REFERENCES

Hurd et al.: Ind. and Eng. Chem., vol. 40, 1948, pp. 2078–2081.

MURRAY TILLMAN, *Primary Examiner.*

W. B. BENGEL, MILTON STERMAN, P. E. MANGAN, H. N. BURSTEIN, M. LIEBMAN, WILLIAM H. SHORT, *Examiners.*